(12) United States Patent
Kim

(10) Patent No.: US 9,563,350 B2
(45) Date of Patent: Feb. 7, 2017

(54) MOBILE TERMINAL AND METHOD FOR CONTROLLING THE SAME

(75) Inventor: Jong Hwan Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 608 days.

(21) Appl. No.: 12/838,807

(22) Filed: Jul. 19, 2010

(65) Prior Publication Data

US 2011/0041102 A1    Feb. 17, 2011

(30) Foreign Application Priority Data

Aug. 11, 2009 (KR) .......................... 10-2009-0073639
Aug. 11, 2009 (KR) .......................... 10-2009-0073640

(51) Int. Cl.
*G06F 3/0488*     (2013.01)
*G06F 3/01*       (2006.01)

(52) U.S. Cl.
CPC .......... *G06F 3/04883* (2013.01); *G06F 3/017* (2013.01); *G06F 3/0488* (2013.01)

(58) Field of Classification Search
CPC .... G06F 3/017; G06F 3/04883; G06F 3/0488; H04M 2250/22
USPC ....................................................... 715/863
See application file for complete search history.

(56) References Cited

U.S. PATENT DOCUMENTS

| | | | | |
|---|---|---|---|---|
| 5,781,663 A * | 7/1998 | Sakaguchi et al. | ........... | 382/189 |
| 6,057,845 A * | 5/2000 | Dupouy | .......... | 715/863 |
| 6,072,494 A * | 6/2000 | Nguyen | .......... | 715/863 |
| 6,249,606 B1 * | 6/2001 | Kiraly et al. | .......... | 382/195 |
| 6,801,658 B2 * | 10/2004 | Morita et al. | .......... | 382/181 |
| 7,593,000 B1 * | 9/2009 | Chin | ................ | G06F 21/32 |
| | | | | 345/156 |
| 7,603,143 B2 * | 10/2009 | Kang et al. | .......... | 455/566 |
| 2004/0188529 A1 * | 9/2004 | Kim | .......... | 235/472.01 |
| 2005/0210418 A1 * | 9/2005 | Marvit et al. | .......... | 715/863 |
| 2005/0275638 A1 * | 12/2005 | Kolmykov-Zotov | | G06F 3/04883 |
| | | | | 345/179 |
| 2006/0075250 A1 * | 4/2006 | Liao | .......... | H04M 1/72519 |
| | | | | 713/182 |
| 2006/0242607 A1 * | 10/2006 | Hudson | .......... | 715/863 |
| 2007/0067745 A1 * | 3/2007 | Choi et al. | .......... | 715/863 |

(Continued)

FOREIGN PATENT DOCUMENTS

| | | |
|---|---|---|
| JP | 2006-527439 | 11/2006 |
| KR | 10-0597798 | 6/2006 |

(Continued)

OTHER PUBLICATIONS

Peer to Patent submission (refers to Webster, "ThrottleLock Brings Android Clone to Windows Mobile", Feb. 3, 2009), 4 pages.*

(Continued)

*Primary Examiner* — Amy Ng
*Assistant Examiner* — William Wong
(74) *Attorney, Agent, or Firm* — Ked & Associates, LLP

(57) ABSTRACT

A mobile terminal and a method for controlling the same are provided, which facilitate diverse functions thereof to be registered in a touch gesture and functions, information and menu icons registered in the touch gesture to be arranged and displayed adjacent to the input touch gesture, when the touch gesture is input on the touchscreen. Further, a mobile terminal and a method for controlling the same are provided, which facilitate a terminal to be used in further consideration of a user's convenience.

3 Claims, 34 Drawing Sheets

(56) References Cited

U.S. PATENT DOCUMENTS

| | | |
|---|---|---|
| 2007/0133555 A1* | 6/2007 | Kim .................... 370/395.3 |
| 2007/0150826 A1* | 6/2007 | Anzures et al. ............. 715/772 |
| 2007/0150842 A1* | 6/2007 | Chaudhri et al. ............ 715/863 |
| 2007/0177803 A1* | 8/2007 | Elias et al. .................. 382/188 |
| 2007/0236468 A1* | 10/2007 | Tuli ............................ 345/173 |
| 2008/0036743 A1* | 2/2008 | Westerman et al. ......... 345/173 |
| 2008/0058007 A1* | 3/2008 | Kang ........................ 455/556.1 |
| 2008/0074399 A1* | 3/2008 | Lee ...................... G06F 3/0482 345/173 |
| 2008/0165145 A1* | 7/2008 | Herz et al. .................... 345/173 |
| 2008/0168403 A1* | 7/2008 | Westerman et al. ......... 715/863 |
| 2008/0220752 A1* | 9/2008 | Forstall .................. H04M 1/56 455/415 |
| 2008/0278455 A1* | 11/2008 | Atkins et al. ................. 345/173 |
| 2009/0005088 A1* | 1/2009 | Hsu .............................. 455/466 |
| 2009/0006991 A1* | 1/2009 | Lindberg et al. ............. 715/763 |
| 2009/0007017 A1* | 1/2009 | Anzures et al. .............. 715/835 |
| 2009/0051648 A1* | 2/2009 | Shamaie et al. ............. 345/156 |
| 2009/0166099 A1* | 7/2009 | Chen et al. ................ 178/18.06 |
| 2009/0265670 A1* | 10/2009 | Kim et al. .................... 715/863 |
| 2009/0284482 A1* | 11/2009 | Chin ............................ 345/173 |
| 2009/0289916 A1* | 11/2009 | Dai .............................. 345/173 |
| 2010/0001967 A1* | 1/2010 | Yoo .............................. 345/173 |
| 2010/0005428 A1* | 1/2010 | Ikeda et al. ................... 715/863 |
| 2010/0058216 A1* | 3/2010 | Yoon .................... G06F 3/0482 715/769 |
| 2010/0058252 A1* | 3/2010 | Ko ...................... G06F 3/04883 715/863 |
| 2010/0079380 A1* | 4/2010 | Nurmi ........................... 345/172 |
| 2010/0104134 A1* | 4/2010 | Wang et al. .................. 382/103 |
| 2010/0125811 A1* | 5/2010 | Moore et al. ................ 715/846 |
| 2010/0127991 A1* | 5/2010 | Yee .................... G06K 9/00422 345/173 |
| 2010/0127998 A1* | 5/2010 | Hyun ........................... 345/173 |
| 2010/0146437 A1* | 6/2010 | Woodcock et al. ........... 715/806 |
| 2010/0162182 A1* | 6/2010 | Oh et al. ....................... 715/863 |
| 2010/0169841 A1* | 7/2010 | Singh ................ G06F 17/30967 715/863 |
| 2010/0240415 A1* | 9/2010 | Kim et al. ..................... 455/565 |
| 2010/0241973 A1* | 9/2010 | Whiddett ...................... 715/762 |
| 2010/0257490 A1* | 10/2010 | Lyon et al. .................... 715/863 |
| 2010/0269040 A1* | 10/2010 | Lee ............................... 715/702 |
| 2010/0306718 A1* | 12/2010 | Shim et al. .................... 715/863 |
| 2010/0333043 A1* | 12/2010 | Faris et al. .................... 715/863 |
| 2011/0047368 A1* | 2/2011 | Sundaramurthy et al. ... 713/100 |
| 2011/0130170 A1* | 6/2011 | Han et al. ..................... 455/566 |

FOREIGN PATENT DOCUMENTS

| | | |
|---|---|---|
| KR | 10-2008-0042574 | 5/2008 |
| KR | 10-0860034 | 9/2008 |

OTHER PUBLICATIONS

Peer to Patent submission (Lindberg, US 20090006991, filed Jun. 29, 2007), 1 page.*
Peer to Patent submission (Arrington, "Android's Login is Cool, but Is It Secure", Oct. 12, 2008), 3 pages.*
Peer to Patent submission (Chen, U.S. Appl. No. 12/241,062 (20090166099), filed Feb. 3, 2009), 1 page.*
Peer to Patent submission (Throttle Lock 0.3c Gesture Unlock, Jan. 1, 2008), 3 pages.*
Peer to Patent submission (Kang, U.S. Pat. No. 7,603,143 B2, filed Aug. 24, 2006), 2 pages.*

* cited by examiner

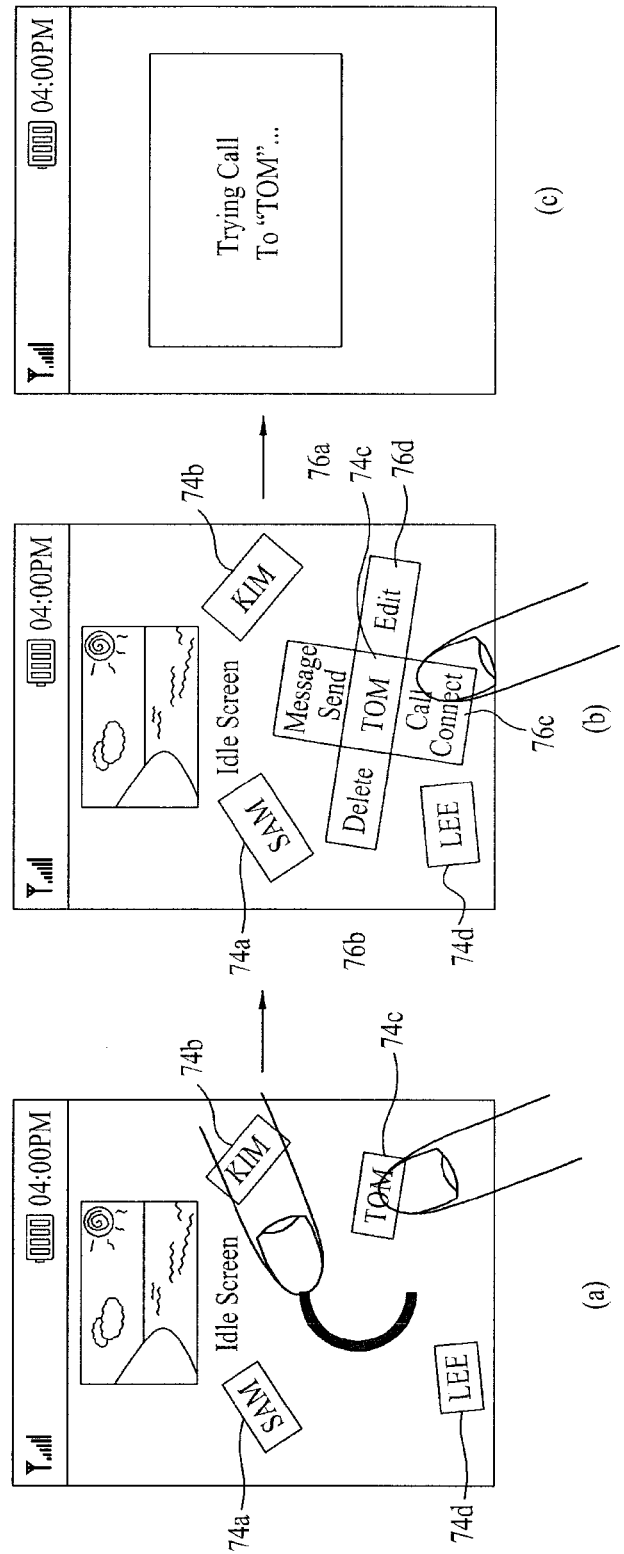

MOBILE TERMINAL AND METHOD FOR CONTROLLING THE SAME

Pursuant to 35 U.S.C. §119(a), this application claims the benefit of earlier filing date and right of priority to Korean Application Nos. 10-2009-0073639, filed on Aug. 11, 2009, and 10-2009-0073640 filed on Aug. 11, 2009, the contents of which are hereby incorporated by reference herein in their entirety.

BACKGROUND OF THE INVENTION

Field of the Invention

The present invention relates to a mobile terminal, and more particularly, to a mobile terminal and a method for the same. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A touchscreen configured as a display device and an input device has been mounted in the mobile terminal.

That is, the mobile terminal displays a user interface (hereinafter, UI) such as a functional icon configured to execute a specific content-function on the touchscreen and the user touches the UI to execute a menu function.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and a method for controlling the same, which facilitates usage-lock of a UI object in a touch-locked touchscreen to be unlocked and a function given to the UI object to be executed by way of a user's touch gesture.

Another object of the present invention is to provide a mobile terminal and a method for controlling the same, which facilitates diverse functions thereof to be registered in a touch gesture and functions, information and menu icons registered in the touch gesture to be arranged and displayed adjacent to the input touch gesture, when the touch gesture is inputted on the touchscreen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a mobile terminal includes a touch-screen configured to display at least one user interface (UI) on a touch-locked screen; a memory configured to set at least one touch gesture for unlocking the touch-locked screen and executing a function, the touch gesture having a specific pattern; and a controller configured to unlock the touch-lock of the screen and to execute a function assigned to the UI object on the touch-unlocked screen when the touch gesture set in the memory is recognized on the UI object.

In another aspect of the present invention, a method for controlling a mobile terminal includes steps of: setting at least one touch gesture mapped with a plurality of functions; searching UI objects having assigned functions mapped with the touch gesture when the touch gesture mapped with the functions is inputted on the touch-unlocked screen; and displaying the searched UI objects on the screen.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 27 to 34 are diagrams of screens illustrating the method for controlling the mobile terminal by way of the touch gesture according to the embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, digital television (DTV), computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

"User interface (hereinafter, UI) object" used in the present specification is configured of texts, images, icons, animations and combinations of two, three or more of them, given a function of executing specific contents.

For example, the UI object may be given an assigned function configured to execute all types of data of the mobile terminal 100. examples of the data include a "phonebook", "message", "music file", "motion picture file", "image file", "schedule" menu, "contact information", "word file", "game file", "calculator file", "webpage address file", "electronic dictionary" and the like.

"touch-locked status" described in the present specification means a status in which a controller 180 may not implement control operation corresponding to a touch signal generated from a touchscreen 151, even if a signal corresponding to a user's touch is generated by the touchscreen 151 when he or she touches the touchscreen 151.

"Function execution locked status of UI object" described in the present specification means that the user sets usage lock of the function assigned to a specific UI object.

Figure 1:
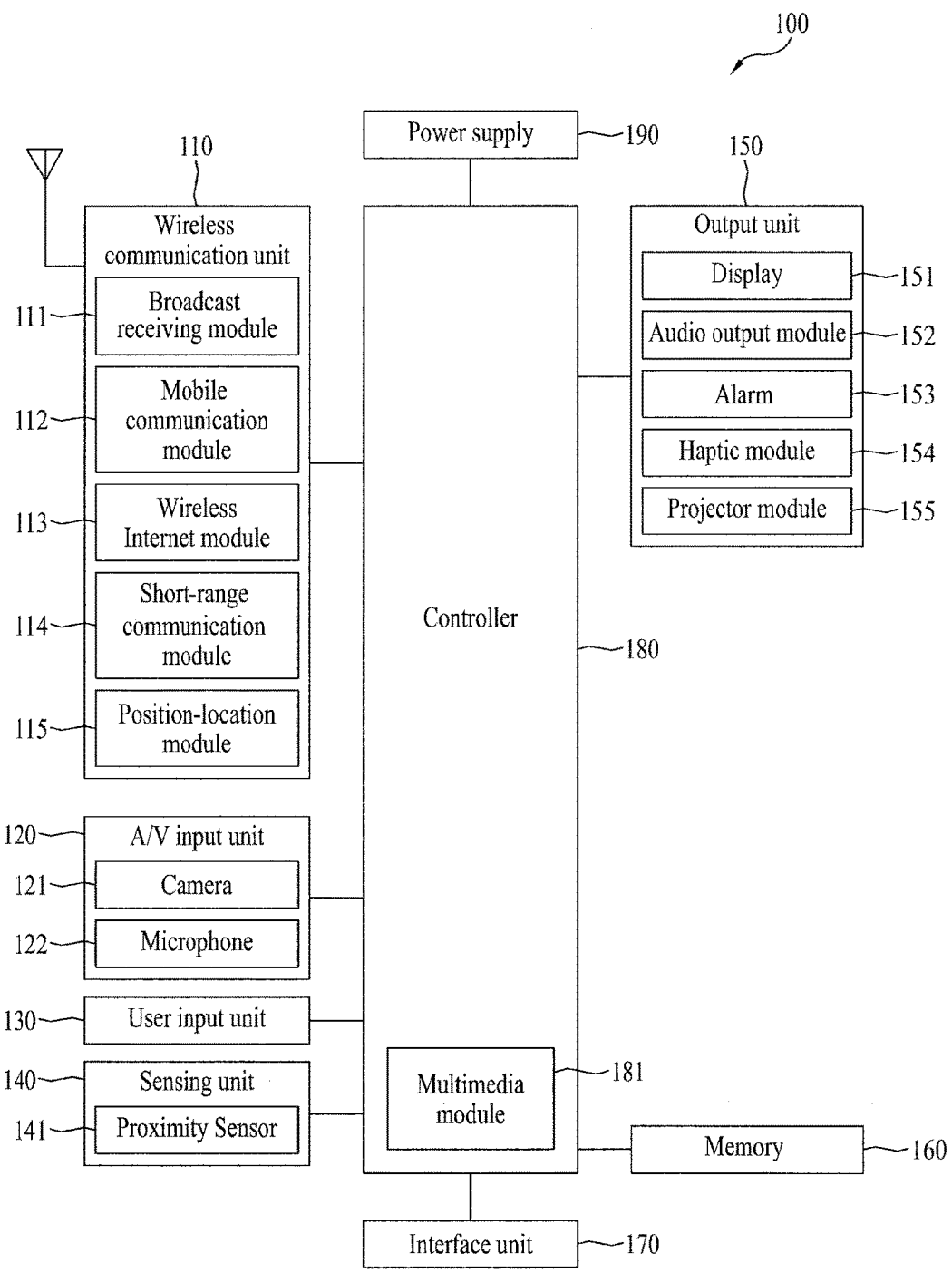
FIG. 1 is a block diagram of a mobile terminal according to one embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), digital video broadcast-convergence of broadcast and mobile services (DVB-CBMS), open mobile affiance-mobile broadcast services enabler (OMA-BCAST), the data broadcasting system known as media forward link only and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN), (WI-FI), Wireless broadband, World Interoperability for Microwave Access, HSDPA(High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In a case that the display 151 and a sensor for detecting a touch action (hereinafter called 'touch sensor') configure a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called ° identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
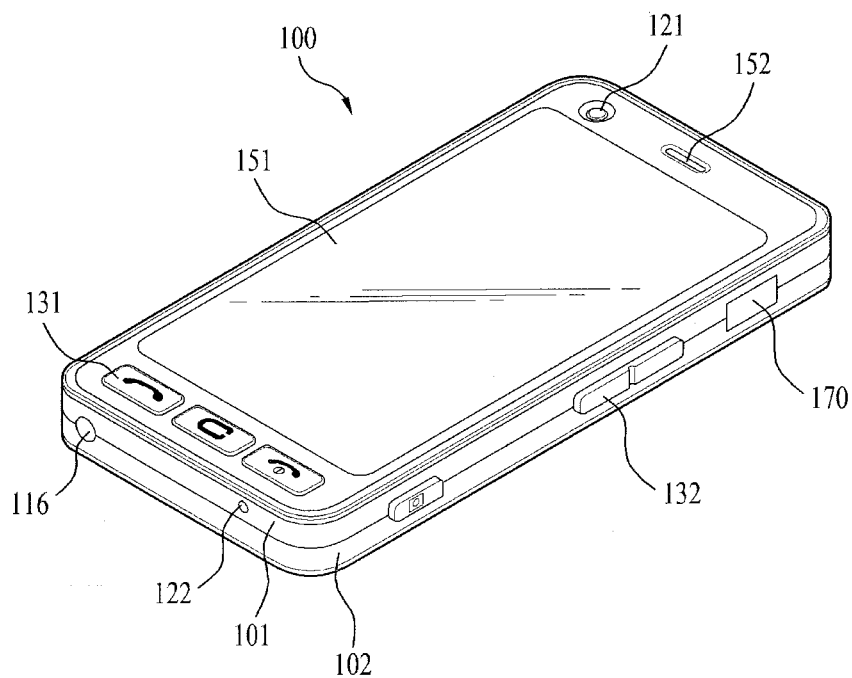
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 152 and the camera 121 are provided to an area adjacent to one of both end portions of the display 151, while a manipulating unit 131 and the microphone 122 are provided to another area adjacent to the other end portion of the display 151. Another manipulating unit 132 and the interface 170 can be provided to lateral sides of the front and rear cases 101 and 102.

The user input unit 130 is manipulated to receive a command for controlling an operation of the terminal 100. And, the user input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
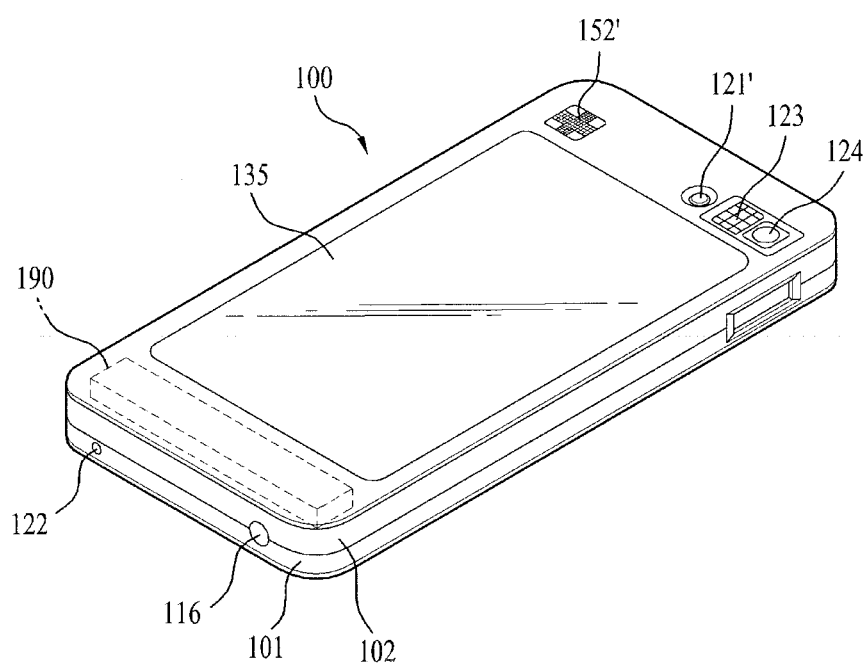
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

First Embodiment

Figure 3:
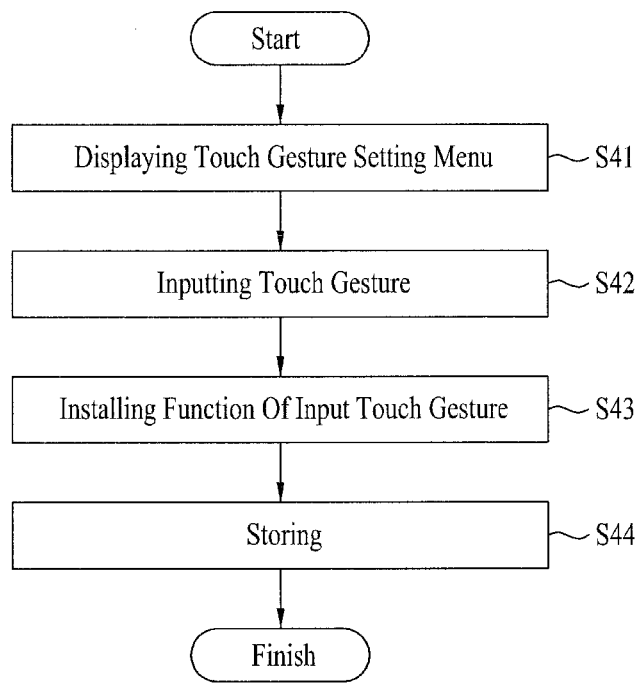
FIG. 3 is a flow chart illustrating a touch gesture setting process according to one embodiment of the present invention.

FIG. 3 is a flow chart illustrating a touch gesture setting process according to a first embodiment of the present invention.

FIGS. 4 to 7 are diagrams of screens illustrating the touch gesture setting process according to the first embodiment of the present invention.

As follows, a touch gesture setting process configured to command the controller's touch unlock for the mobile terminal 100, UI object function execution unlock and UI object function execution will be described in reference to FIGS. 3 to 7.

First of all, in reference to FIG. 3, when the user selects a menu configured to set a touch gesture to command touch-unlock for the touchscreen 151 and function-execution unlock for the UI object and function execution for the UI object via a touchscreen type of the display 151 (hereinafter, 'touchscreen'), the controller 180 of the mobile terminal 100 displays the touch gesture setting menu on the screen [S41].

When the user inputs a touch gesture having a predetermined pattern [S42] to set a function of the input touch gesture [S43], the controller 180 maps the pattern and function of the input touch gesture with each other and it stores the mapped result in a memory 160 [S44].

Figure 4:
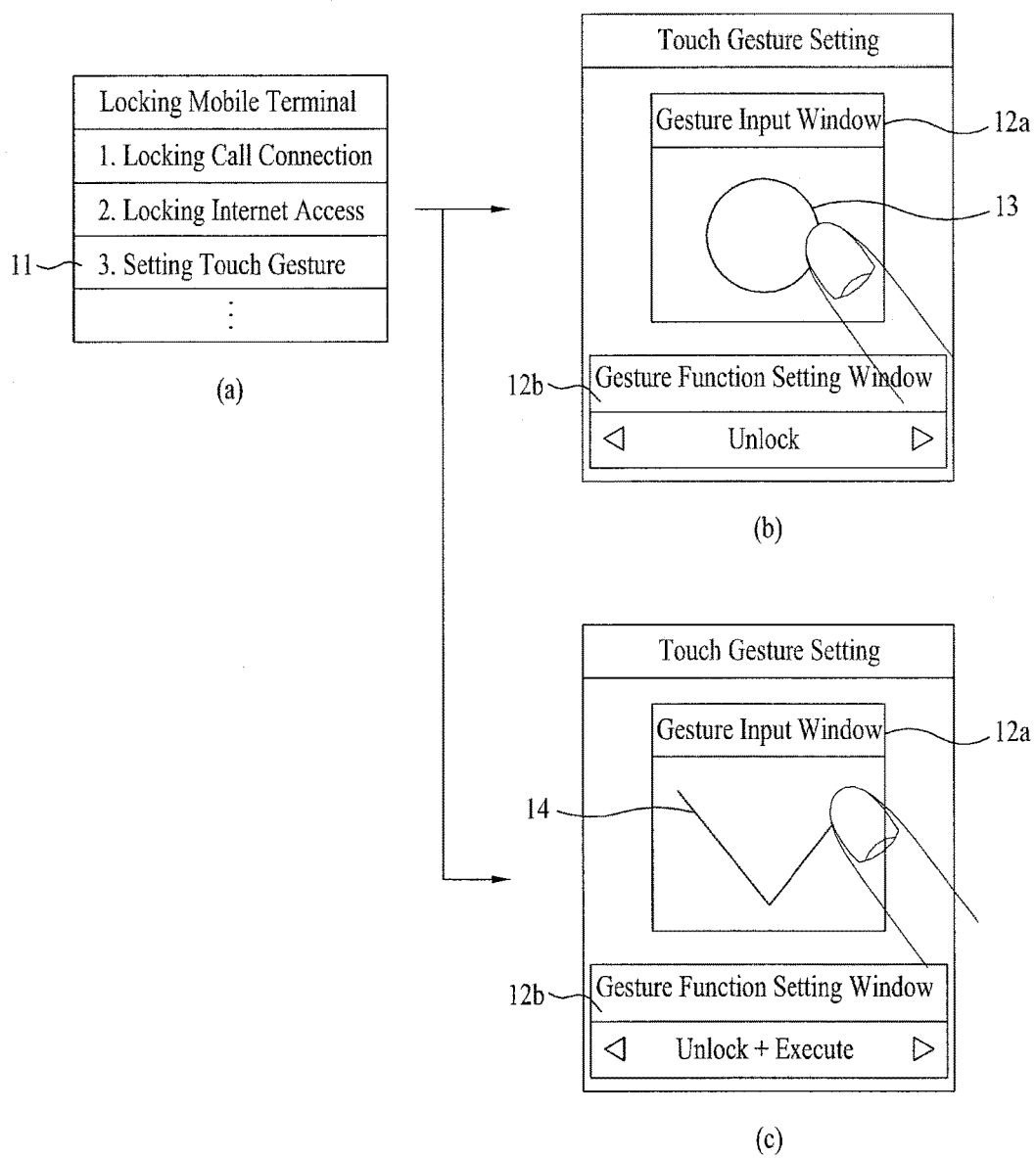
FIGS. 4 to 7 are diagrams of screens illustrating the touch gesture setting process according to the embodiment of the present invention.

For example, when "3. touch gesture setting" menu 11 is selected as shown in FIG. 4 (*a*), the controller 180 displays a gesture input window 12*a* and a gesture function setting window 12*b* as shown in FIG. 4 (*b*).

Here, according to FIG. 4 (*b*), a first touch gesture 13 having a first pattern is inputted by the user via the gesture input window 12*a* and the gesture function setting window 12*b* displays that "unlock" function is set.

At this time, "unlock" function means a function including touch unlock for the touchscreen 151 and function-execution unlock for UI object.

For example, in case a first UI object having function execution locked is displayed on the touch-locked touchscreen 151, with the first touch gesture 13 shown in FIG. 4 (*b*) set in the memory 160, the controller 180 recognizes a touch gesture having an identical pattern to the first touch gesture 13 inputted from the user on the first UI object. After that, the controller 180 unlocks the touch-lock of the touchscreen 151 and the function execution lock of the first object.

Although not shown in FIG. 4 (*b*), the user may set the touch-unlock function for the touchscreen 151 and the function-execution-unlock function for the UI object independently.

Also, the user may contact-touches to input the first pattern of the first touch gesture 13 to the touchscreen 151 and he or she may proximity-touches to input the first pattern to a proximity sensor 141 provided in the touchscreen 151. A touch system which will be described later includes "contact-touch" and "proximity-touch."

According to FIG. 4 (*c*), a second touch gesture 14 having a second pattern is inputted by the user via the gesture input window 12*a* and the gesture function setting window 12*b* displays that "unlock and execution" function is set.

For example, when the first UI object having a locked function execution is displayed on the touch-locked touchscreen 151, with the second touch gesture 14 shown in FIG. 4 (*c*) being set in the memory 160, the controller 180 recognizes a touch gesture having an identical pattern to the pattern of the second touch gesture 14 on the first UI object. After that, the controller 180 executes the touch unlock for the touchscreen 151, the function execution unlock for the first UI object and the function of the first UI object.

That is, when the first UI object is an icon connected with "internet," the controller 180 controls the wireless communication unit 110 to access to a webpage corresponding to the "internet" connected icon.

At this time, although the gesture function setting window 12*b* shown in FIG. 4(*c*) displays that "touch unlock" and "function execution unlock and function execution for the first UI object" are set, the user may set "touch unlock and function execution" and "first UI function execution unlock and function execution".

Also, when the second touch gesture 14 is inputted by the user via the gesture input window 12*a*, the controller 180 may set a touch keeping time of a predetermined point of the second touch gesture 14, too. For example, when the user keeps "1 second" touch at the last point of "v" which is the second touch gesture 14, the controller 180 sets the second pattern of the second touch gesture 14 and the "1 second touch keeping time" together.

That is, in case the first UI object having the function execution locked is displayed on the touch-locked touchscreen 151, with the second touch gesture 14 shown in FIG. 4 (*c*) and the "1 second" touch keeping time being set in the memory 160, "∨" touch gesture having a pattern identical to the second touch gesture is inputted on the first UI object and "1 second" touch is kept at the last point of the input "□" touch gesture is recognized. Then, the controller executes the touch unlock for the touchscreen 151 and the function execution unlock and function execution for the first UI object.

That is, when the first UI object is "internet" connected icon, the controller 180 controls the wireless communication unit 110 to access to a webpage corresponding to the "internet" connected icon.

Figure 5:
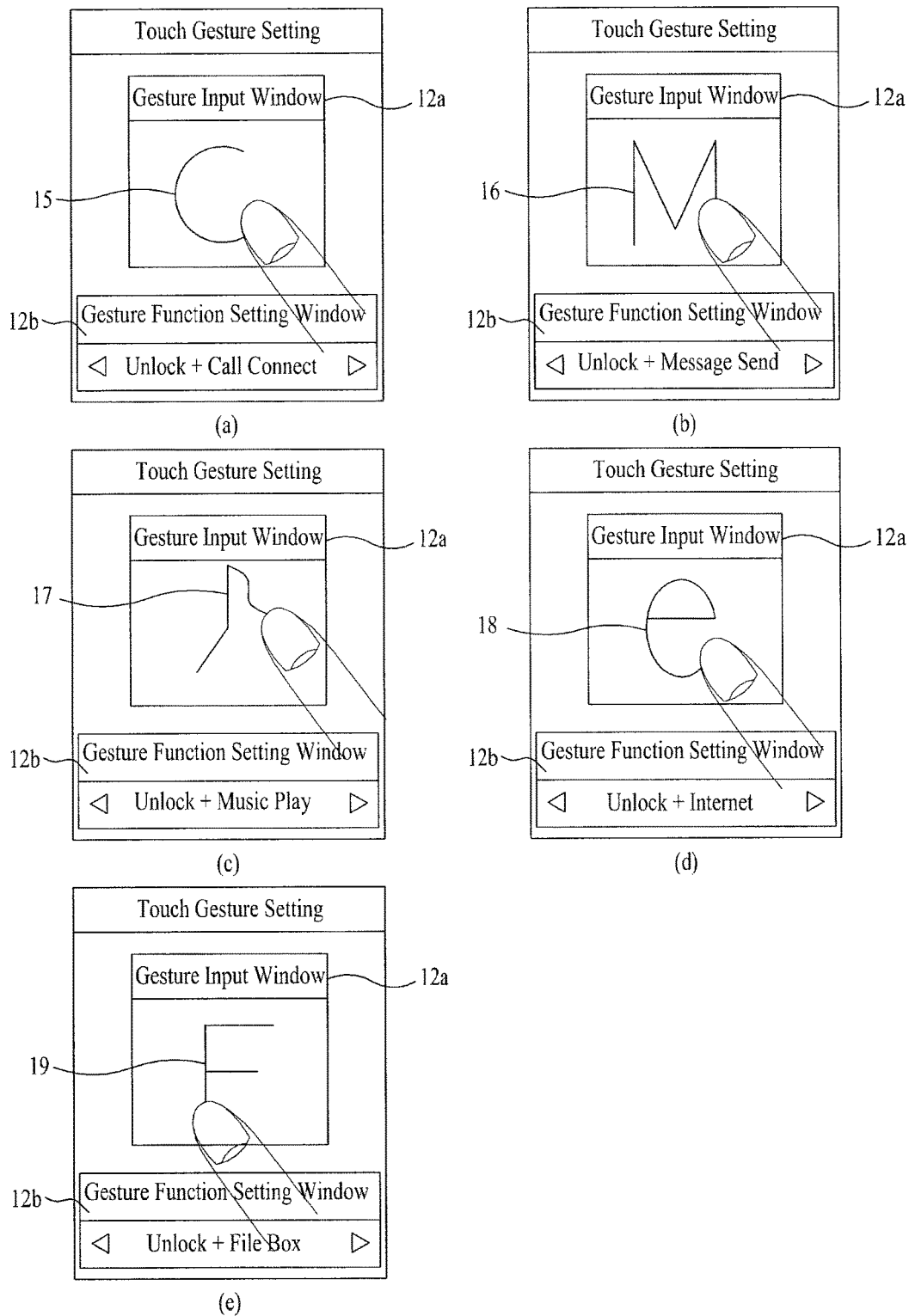

FIGS. 5 (a) to (e) are diagrams illustrating that diverse touch gestures inputted by the user and a "unlock and diverse types of menus execution" function is set in the touch gestures.

That is, FIG. 5 illustrates a process in that the user sets touch gestures on the screen based on a category of UI object functions recognized by himself or herself.

According to FIG.5 (a), a third touch gesture 15 having a third pattern is inputted by the user via the gesture input window 12a and the gesture function setting window 12b displays that "unlock and calling connection" function is set. Here, the third pattern may be an initial "C" of "call."

For example, when the controller 180 recognizes that the third touch gesture 15 having "C" inputted by the user is on "contact information" UI object in case "contact information" UI object having a locked function-execution displayed on the touch-locked touchscreen 151, with the third touch gesture 15 shown in FIG. 5 (a) being set in the memory 160, the controller 180 implements the touch-unlock for the touchscreen 151 and the function execution unlock for "contact information" UI object and it controls the wireless communication unit 110 to connect a "contact information" call.

According to FIG. 5 (b), a fourth touch gesture 16 having a fourth pattern is inputted by the user via the gesture input window 12a and the touch gesture function window 12b displays that "Unlock and Message send" function is set. At this time, the fourth pattern may be "M" which is an initial of "Message."

For example, when the controller 180 recognizes the fourth touch gesture represented as "M" inputted by the user is on "contact information" UI object having the locked function execution in case the "contact address" UI object having a locked function execution is displayed on the touch-locked touchscreen 151, with the fourth touch gesture 16 shown in FIG. 5 (b) being set in the memory 160, the controller 180 implements touch unlock for the touchscreen 151 and function execution unlock for "contact information UI object and it displays a message input window to transmit on the "contact information".

According to FIG. 5 (c), a fifth touch gesture 17 having a fifth pattern is inputted by the user via the gesture input window 12a and the gesture function setting window 12b displays that "Unlock and music file playing" function is set. At this time, the fifth pattern may be "♪" representing "music file."

For example, when the controller 180 recognizes the fifth touch gesture 17 represented as "♪" inputted by the user on the "a.mp3" UI object in case "a.mp3" UI object having a locked function execution is displayed on the touch-locked touchscreen 151 ,with the fifth touch gesture shown in FIG. 5 (c) being set in the memory 160, the controller implements touch unlock for the touchscreen 151 and function execution unlock for "a.mp3" UI object and it controls the audio output module 152 to play the "a.mp3" music file.

According to FIG. 5 (d), a sixth touch gesture 18 having a sixth pattern is inputted from the user via the gesture input window 12a and the gesture function setting window 12b displays that "unlock and Internet" function is set. At this time, the sixth pattern may be represented as "e" which is an initial of "Internet."

For example, in case "my homepage.htm" UI object having a locked function-execution is displayed on the touch-locked touchscreen 151, with the sixth touch gesture shown in FIG. 5 (d) being set in the memory the controller recognizes the sixth touch gesture 18 having the sixth pattern represented as inputted by the user on "my homepage.htm" UI object. After that, the controller 180 implements touch unlock for the touchscreen 151 and function-execution unlock for the "my homepage.htm" UI object and it controls the wireless communication unit 110 to access a webpage corresponding to URL address of "my homepage.htm."

According to FIG. 5 (e), a seventh touch gesture 19 having a seventh pattern is inputted from the user via the gesture input window 12a and the touch gesture function setting 12b displays that "Unlock and file box" function is set. At this time, the seventh pattern may be represented as "F" which is an initial of "file."

For example, in case "file box menu" UI object having a locked function execution is displayed on the touch-locked touchscreen 151, with the seventh touch gesture 19 shown in FIG. 5 (e) being set in the memory 160, the controller 180 recognizes the seventh touch gesture 19 represented as "F" inputted from the user on "file box" UI object. After that, the controller implements touch unlock for the touchscreen 151 and function execution unlock and the file box menu execution for the "file box menu" UI object and it displays a list stored in the file box.

As mentioned above, processes configured to set "Unlock and call connection", "Unlock and message send", "Unlock and music file playing", "Unlock and internet" and "Unlock and file box" are described.

However, the present invention is not limited to the above functions shown in FIG. 5. According to the present invention, "Unlock and all data and all menu of mobile terminal" may be set in the touch gesture.

In the meanwhile, in case the user inputs too simple touch gestures when setting the touch gesture recognizable by himself or herself, other people would happen to figure out the touch gestures set by the user.

As follows, a process of the controller 180 warning the user and requesting re-input of touch gestures will be described in reference to FIG. 6, in case the user inputs too simple touch gestures.

Figure 6:
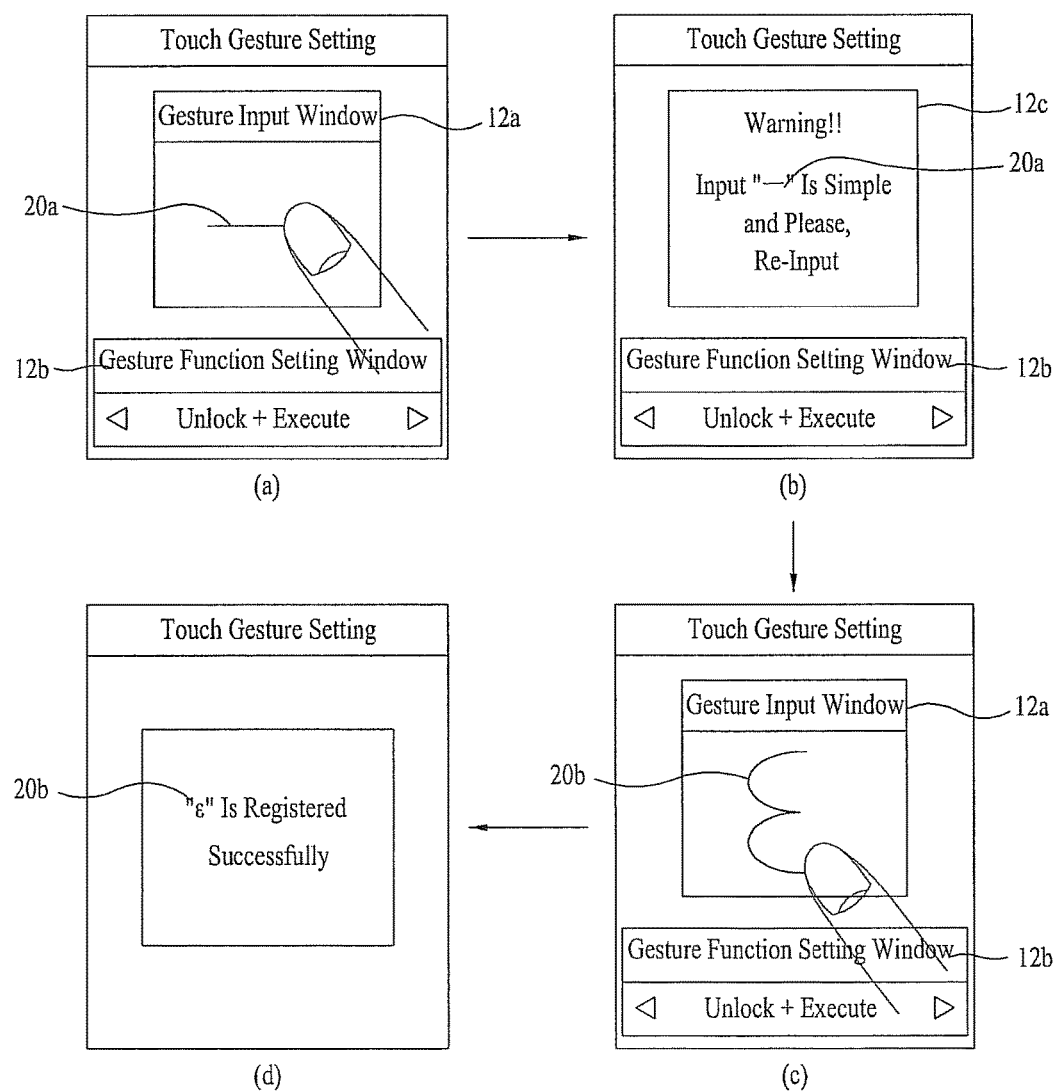

That is, according to FIG. 6 (a), the user inputs a touch gesture 20a represented as "-" on the gesture input window 12a.

At this time, the controller 180 determines whether the touch gesture inputted by the user has a simple pattern based on the amount of pixels and pattern variation of the touch gesture inputted on the gesture input window 12a.

That is, the controller 180 examines the pixel amount and pattern variation of the touch gesture inputted on the gesture input window 12a. When the examined pixel amount and pattern variation are below a reference pixel amount and a reference pattern variation, respectively, the controller 180 determines the pattern of the touch gesture inputted by the user to be simple. When they are beyond the reference pixel amount and the reference pattern variation, respectively, the controller 180 determines the pattern of the input touch gesture to be appropriate.

When the controller 180 determines "-" pattern of the touch gesture 20a inputted from the user to be simple as mentioned above, the controller 180 displays a warning window 12c on the touchscreen 151 and it requests the user to re-input a touch gesture as shown in FIG. 6 (b).

Figure 10:
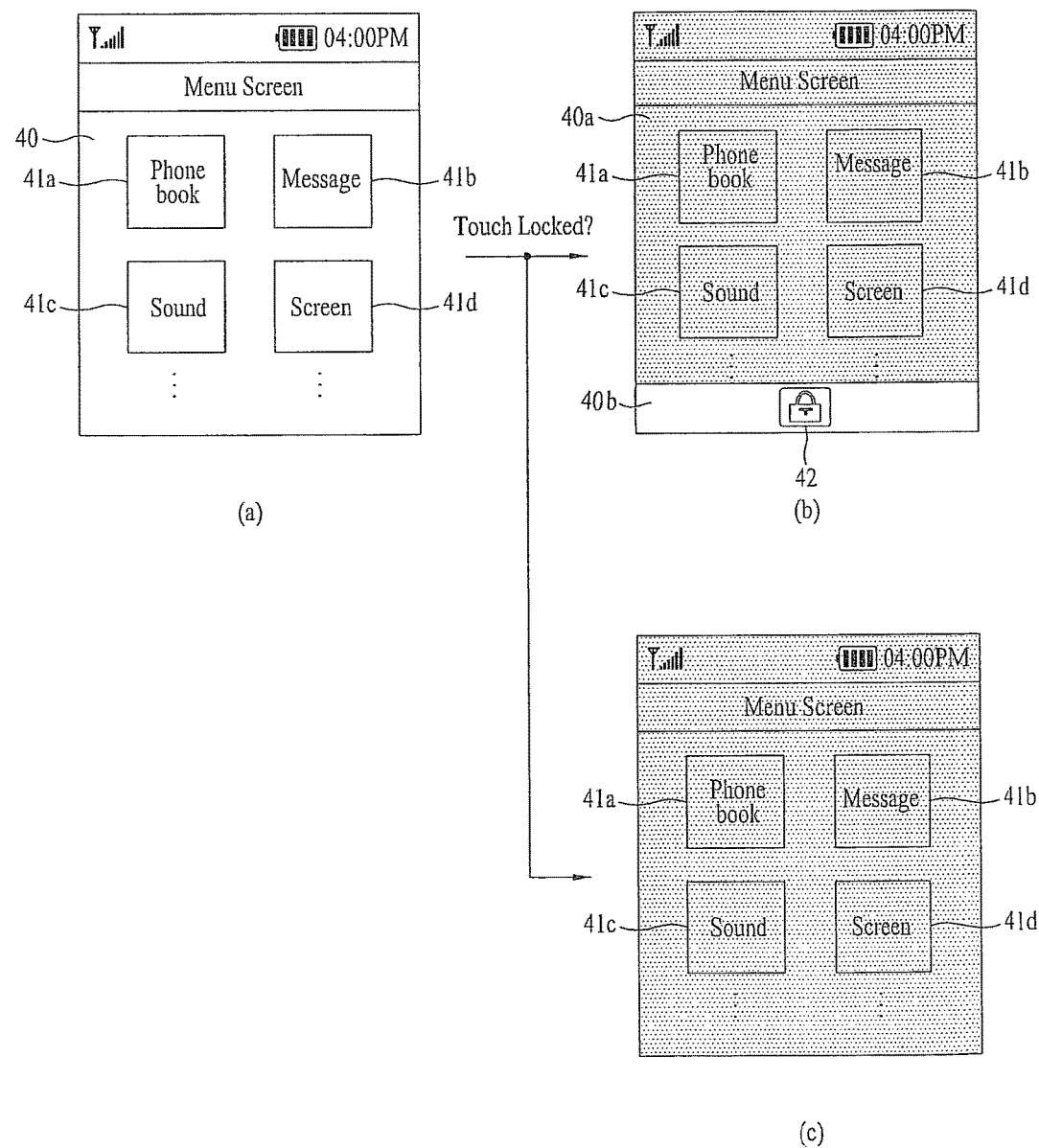

When "ϵ" pattern of the touch gesture re-inputted from the user is determined not simple via the above process as shown in FIG. 6 (c), the controller 180 stores the touch gesture 20b inputted from the user and "Unlock and execution" function is stored in the memory 160 as shown in FIG. 10 (d).

Figure 7:
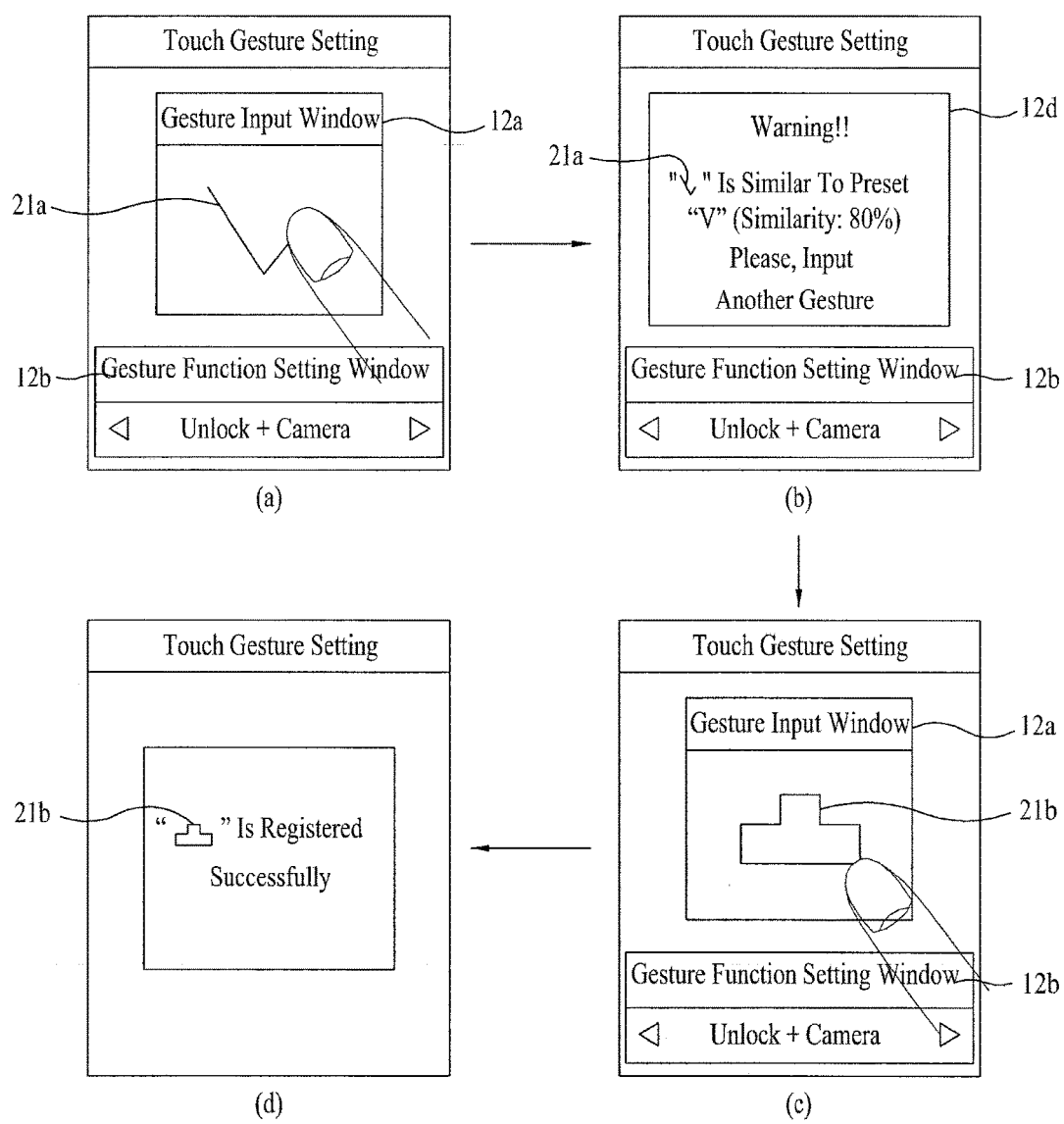

According to FIG. 7, when a touch gesture having a similar pattern to the touch gesture inputted from the user is searched in the memory 160 when the user inputs a touch gesture on the gesture input window 12a, similarity between the similar touch gesture and the input touch gesture is displayed to guide the user to input an independent pattern not similar to the touch gestures stored in the memory 160.

That is, as shown in FIG. 7 (a), the controller 180 displays via the gesture input window 12a that a touch gesture having a similar pattern to the second pattern 14 shown in FIG. 4 (c) is inputted from the user.

At this time, the controller 180 compares the input pattern 21a with each of patterns of the touch gestures stored in the memory 160 and it measures similarity between the pattern 21a with a pattern similar to the pattern 21a based on the result of the comparison. Then, the controller 180 displays a window 12d presenting the second pattern 14 similar to the pattern 21a and the similarity (80%) between the pattern 21a with the second pattern 14 as shown in FIG. 7 (b), to request the user to re-input a touch gesture.

When a pattern of the re-input touch gesture is not similar to the patterns of the touch gestures stored in the memory 160 as shown in FIG. 7 (c), the controller 180 stores the re-input touch gesture 21b and "Unlock and camera" function in the memory 160 as shown in FIG. 7 (d).

In reference to FIGS. 3 to 7, the processes configured to set the touch gestures to command the touch unlock for the touchscreen and the function execution unlock and function execution for UI object are described in detail.

As follows, processes configured to implement the touch unlock for the touch gesture and the function execution unlock and function execution for the UI object by way of the touch gesture according to the first embodiment of the present invention will be described in reference to FIGS. 8 to 22.

Figure 8:
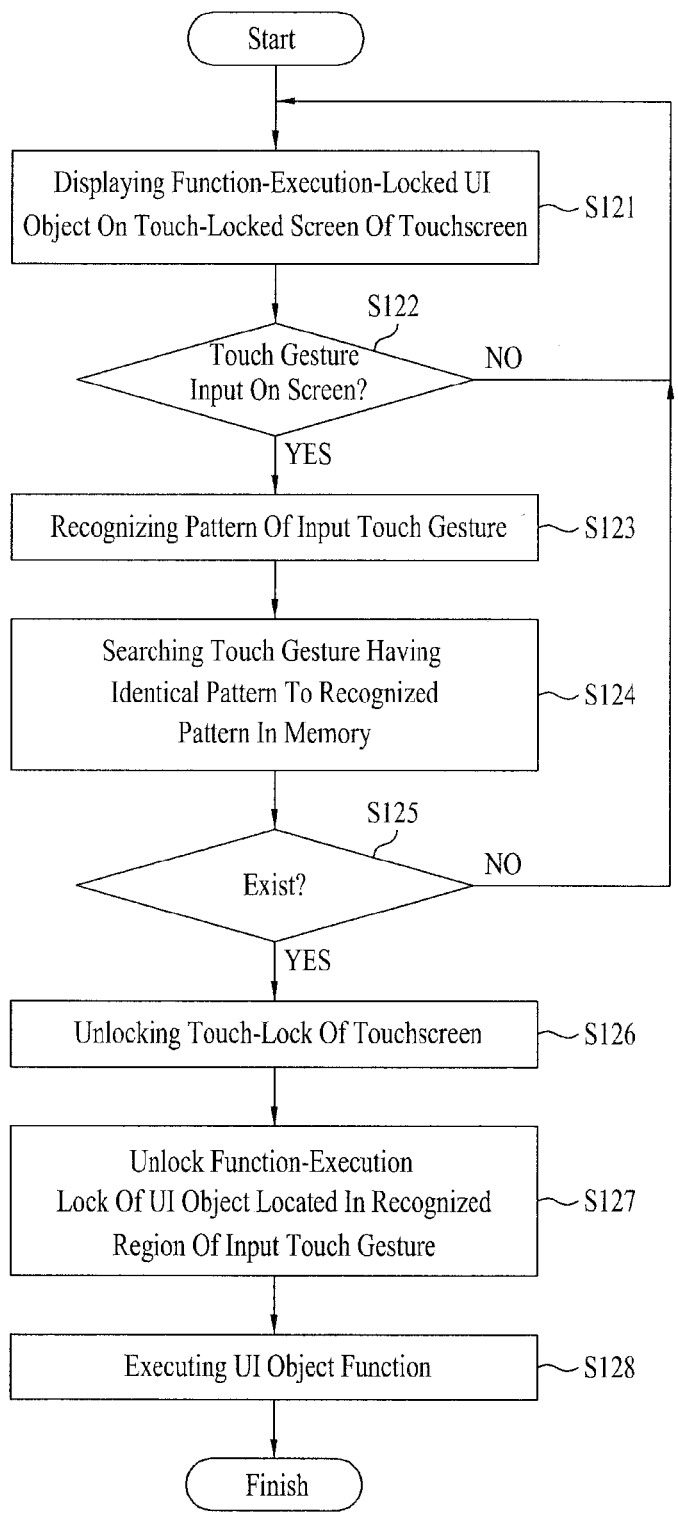
FIG. 8 is a flow chart illlustrating a method for controlling a mobile terminal by way of the touch gesture according to the embodiment of the present invention.

FIG. 8 is a flow chart illustrating a method for controlling a mobile terminal by way of the touch gesture according to the first embodiment of the present invention.

FIGS. 9 to 22 are diagrams of screens illustrating the method for controlling the mobile terminal by way of the touch gesture according to the first embodiment of the present invention.

First of all, in reference to FIG. 8, the controller 180 of the mobile terminal 100 displays at least one UI object having a locked function execution on the touch locked touchscreen [S121].

Figure 9:
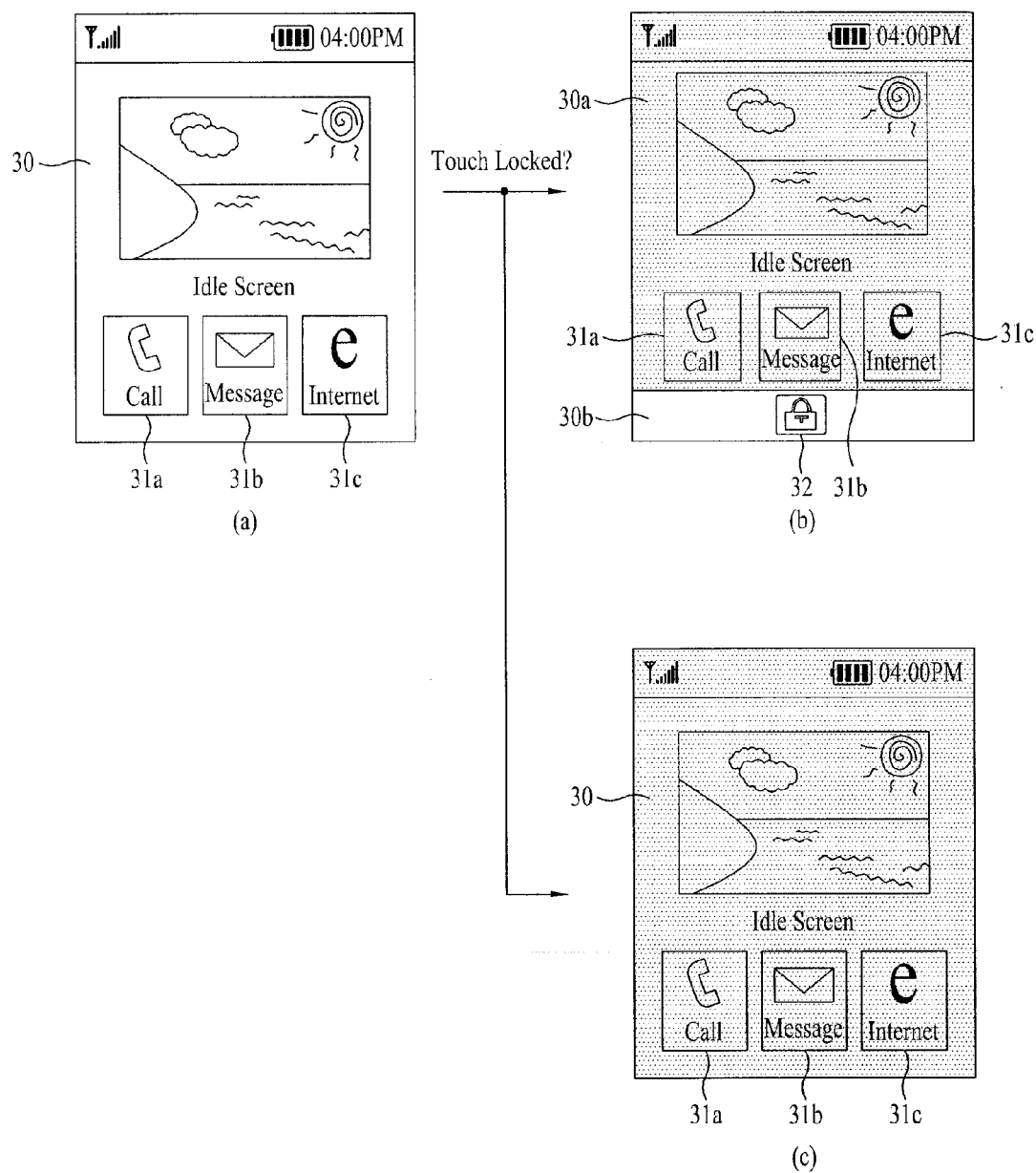
FIGS. 9 to 22 are diagrams of screens illustrating a method for controlling a mobile terminal by way of the touch gesture according to the embodiment of the present invention.

Here, FIG. 9 illustrates that an idle-screen 30 of the touchscreen 151 is full-touch-locked or partial-touch-locked.

That is, FIG. 9 (a) illustrates that first to third UI objects 31a, 31b and 31c are displayed on the idle-screen 30. Based on the user's touch lock setting, the controller 180 may touch-lock a predetermined region 30a of the idle-screen 30 of the touchscreen 151 as shown in FIG. 9 (b) or an entire region of the idle-screen 30 of the touchscreen 151 as shown in FIG. 9 (c).

At this time, the first to third UI objects 31a, 31b and 31c may be objects given identical or different category menu functions.

For example, in case they are given the identical-category menu functions, the first to third UI objects 31a, 31b and 31c may be given "message send", "message inbox", "message outbox" and the like.

Alternatively, in case they are given the different-category menu functions, the first to third UI objects 31a, 31b and 31c may be given "call connection," "message send", "internet connection" and the like.

The controller 180 may set a partial-touch lock or full-touch lock the touchscreen 151 when a touch signal is not generated from the touchscreen 151 for a predetermined time period, rather than controls touch-lock set by the user.

According to FIG. 9 (b), a first region 30a of the idle-screen 30 is touch-locked and a second region 30b of the idle-screen 30 displays UI object 32 to touch-unlock the first region 30a. When the user touches the touch-unlock UI object 32, the controller 180 may touch-unlock the first region 30a.

FIG. 10 illustrates that a menu screen 40 of the touchscreen 151 is full-touch locked or partial-touch locked.

That is, first to fourth UI objects 41a, 41b, 41c and 41d are displayed on the menu screen 40 as shown in FIG. 10 (a). The controller 180 may touch-lock a predetermined region 40a of the menu screen 40 of the touchscreen 151 based on the user's touch lock setting as shown in FIG. 10 (b) and it may touch-lock a full region of the menu screen 40 of the touchscreen 151 as shown in FIG. 10 (c).

According to FIG. 10 (b), a first region 40a of the menu screen 40 is touch-locked and a second region 40b of the menu screen 40 displays touch-unlock UI object 42. When the user touches the touch-unlock UI object 42, the controller 180 may touch-unlock the first region 41a.

In the meanwhile, when a touch gesture having a predetermined pattern is input on the touchscreen 151 [S122], the controller 180 recognizes the pattern of the input touch gesture [S123] and it searches a touch gesture having an identical to the recognized pattern in the memory 160 [S124].

At this time, the controller 180 may search a touch gesture having an identical pattern to the recognized pattern or a touch gesture having a similar pattern to the recognized pattern in the memory based on the user's similarity setting.

For example, when the user sets 80% of the similarity, the controller may search a touch gesture having a pattern similar to the pattern of the input touch gesture by 80% or more.

The similarity setting may be provided in the menu functions of the mobile terminal 100 such that the user may set and changes the similarity via the similarity setting menu provided in the mobile terminal 100.

When the touch gesture having the identical pattern to the recognized pattern is searched in the memory 160 [S125], the controller 180 touch-unlocks the touchscreen 151 and it unlocks a function execution for a UI object located in a region, where the input touch gesture is recognized, on the touchscreen 151 [S127].

Hence, the controller 180 executes the unlocked UI object function [S128].

As follows, a process of implementing touch unlock for the touchscreen 151 and function execution unlock and function execution for a UI object by way of the touch gesture will be described in reference to FIGS. 11 to 22.

Figure 11:
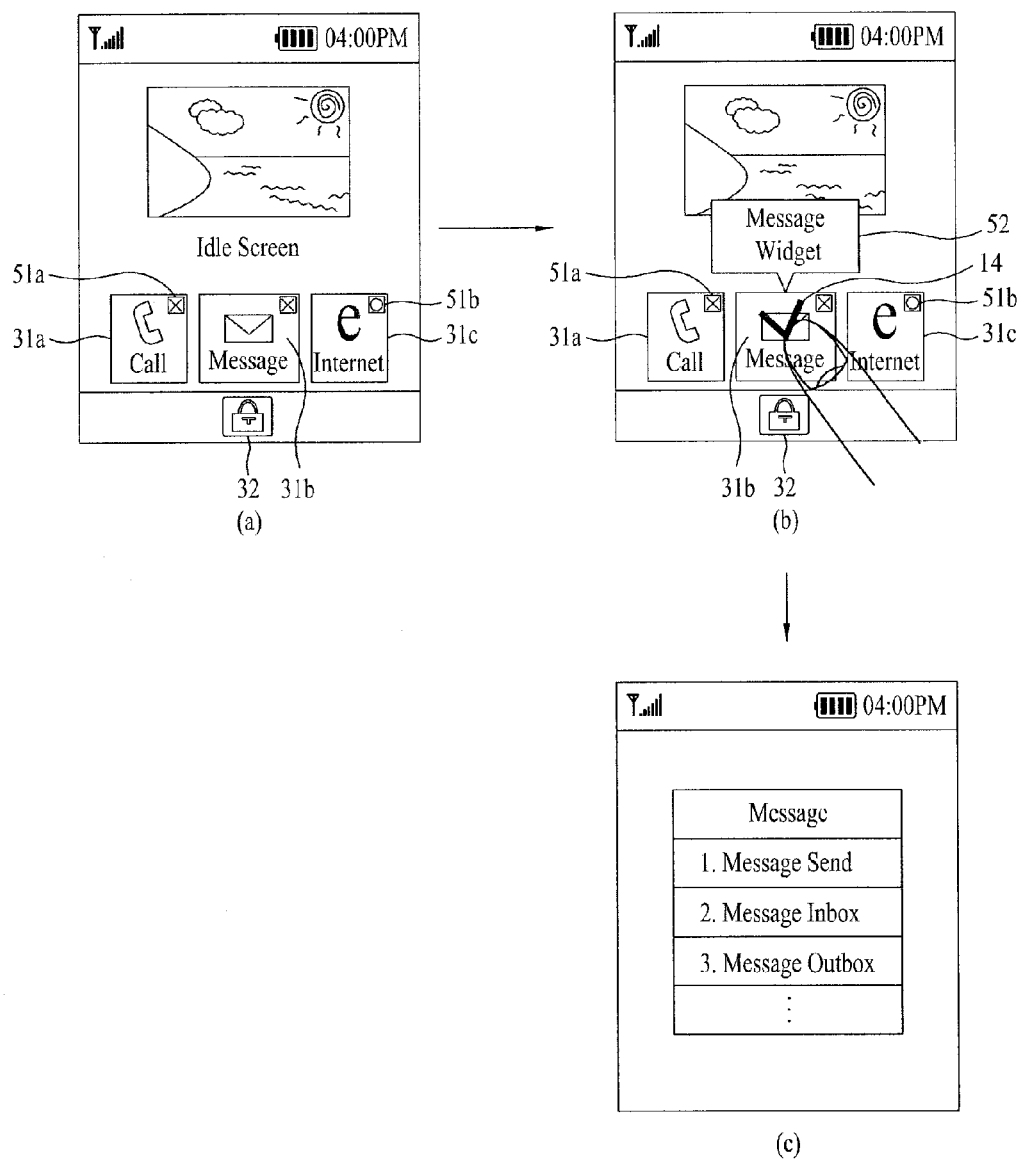

First of all, according to FIG. 11 (a), "call" UI object 31a, "message" UI object 31b and "internet" UI object 31c, which are different-category menu functions, are displayed on the idle-screen of the touch-locked touchscreen 151.

At this time, the controller 180 may determine whether function execution for each of the "call" UI object 31*a*, "message" UI object 31*b* and "internet" UI object 31*c* is locked as shown in FIG. 11 (*a*) and it may display identifiers 51*a* and 51*b* to identify the function execution lock for the "call" UI object 31*a*, "message" UI object 31*b* and "internet" UI object 31*c*.

That is, when the function execution for the "call" UI object 31*a* and "message" UI object 31*b* is locked, the controller 180 may display a first identifier 51*a* configured to identify a function execution locked status in the "call" UI object 31*a* and "message" UI object 31*b*.

When the function execution for "internet" UI object 31*c* is not locked, the controller 180 may display a second identifier 51*b* configured to identify a function-execution unlocked status in the "interne" UI object 31*c*.

When recognizing a touch gesture having a predetermined pattern 14 on "message" UI object, the controller searches a touch gesture having an identical pattern to the recognized pattern in the memory 160.

The user may input a touch gesture on "message" UI object 31*b* via a direct contact-touch with respect to the touchscreen 151 or proximity-touch with respect to the touchscreen 151 by way of the proximity sensor 141, as shown in FIG. 11 (*b*).

The pattern inputted as shown in FIG. 11 (*b*) is identical to the second pattern of the second touch gesture set in the memory 160 as shown in FIGS. 4 and 5. as a result, the controller 180 implements touch unlock for the touchscreen and the function execution lock for "message" UI object 31*b* and it implements "message" menu which is a function corresponding to "message" UI object 31*b*, as shown in FIG. 11 (*c*).

Here, when recognizing a touch gesture having the pattern 14 on "message" UI object 31*b*, the controller 180 may display to distinguish "message" UI object 31*b* having the recognized touch gesture from the other "call" UI object 31*a* and "internet" UI object 31*c*.

For example, when recognizing a touch gesture having the pattern 14 on "message" UI object 31*b*, the controller 180 may differentiate transparency of "message" UI object 31*b* from "call" UI object 31*a* and "internet" UI object 31*c*.

Alternatively, the controller 180 may display a highlight, underline, background color for "message" UI object 31*b* to differentiate "message" UI object 31*b* from "call" UI object 31*a* and "internet" UI object 31*c*.

Alternatively, the controller 180 may highlight an edge of "message" UI object 31*b* or change a color, shape or characteristic of text to differentiate "message" UI object 31*b* from "call" UI object 31*a* and "internet" UI object 31*c*.

Alternatively, the controller 180 may enlarge the size of "message" UI object 31*b* to differentiate "message" UI object 31*b* from "call" UI object 31*a* and "internet" UI object 31*c*.

In the meanwhile, when recognizing the touch gesture having the pattern 14 on "message" UI object 31*b*, the controller 180 may display detailed information of "message" UI object 31*b* adjacent to "message" UI object 31*b*, as shown in FIG. 11 (*b*).

Figure 12:
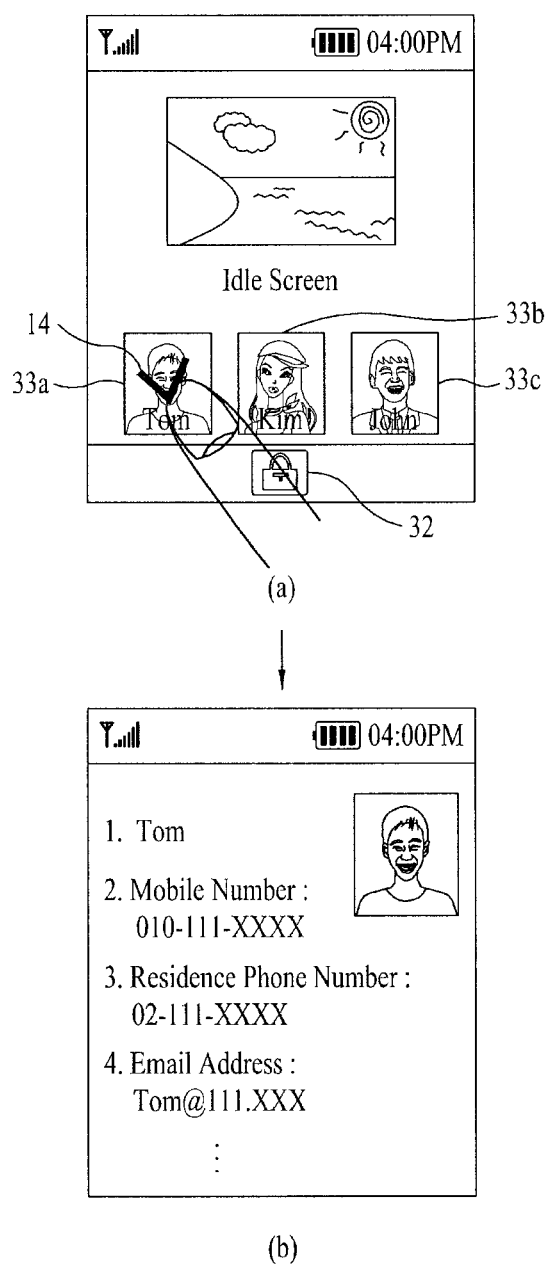

Next, according to FIG. 12 (*a*), "TOM," "KIM" AND "JOHN" contact address UI objects 33*a*, 33*b* and 33*c*, which are identical-category menu functions, are displayed on the idle-screen of the touch-locked touchscreen 151.

At this time, when recognizing a touch gesture having a predetermined pattern 14 on "TOM" contact address UI object 33*a* as shown in FIG. 12 (*a*), the controller 180 searches a touch gesture having an identical pattern to the recognized pattern 14 in the memory 160.

Here, the pattern input as shown in FIG. 12 (*a*) is identical to the second pattern of the second touch gesture 14 set in the memory 160 shown in FIGS. 4 and 5. as a result, as shown in FIG. 12 (*b*), the controller 180 implements touch-unlock for the touchscreen 151 and function execution unlock for "TOM" contact address UI object 33*a* and it displays information of "TOM" contact address.

Figure 13:
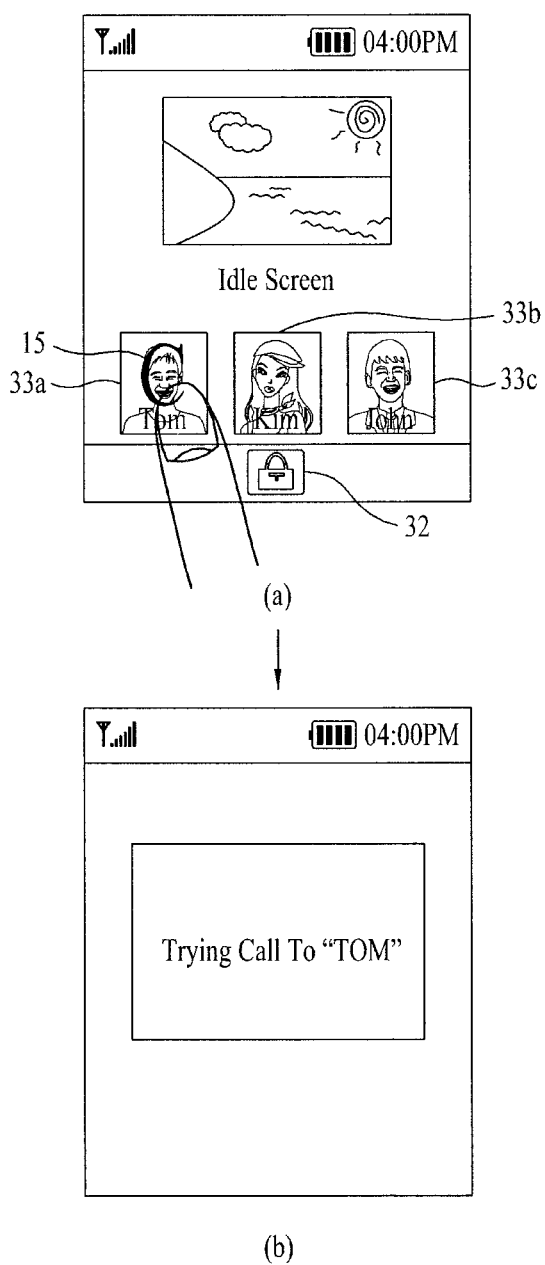

According to FIG. 13 (*a*), the user inputs a touch gesture having a predetermined pattern 15 on "TOM" contact address UI object 33*a*.

At this time, the pattern 15 of the touch gesture inputted from the user is identical to the third pattern of the third touch gesture set in the memory 160 as shown in FIGS. 4 and 5. as a result, the controller 180 implements touch-unlock for the touchscreen 151 and function execution unlock for "TOM" contact address UI object 33*a* and it controls the wireless communication unit 110 to try connecting to a telephone number configured in "TOM" contact address, as shown in FIG. 13 (*b*).

Figure 14:
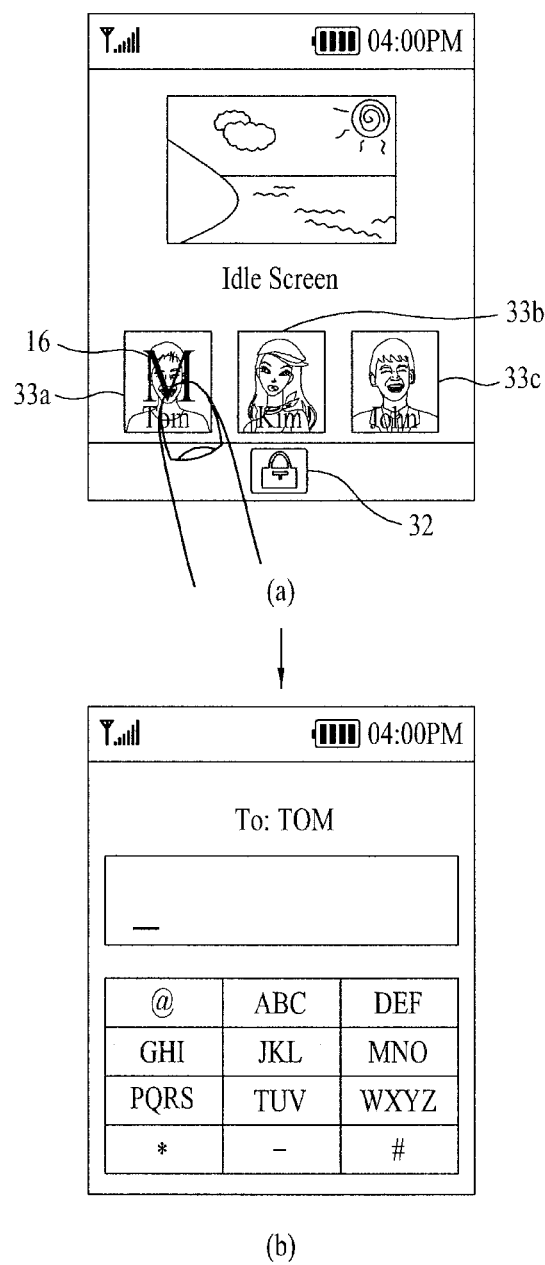

FIG. 14 (*a*) illustrates that the user inputs a touch gesture having a predetermined pattern 16 on "TOM" contact address UI object 33*a*.

At this time, the pattern 16 of the touch gesture inputted from the user is identical to the fourth pattern of the fourth touch gesture 16 set in the memory 160 as shown in FIGS. 4 and 5. as a result, the controller 180 implements touch-unlock for the touchscreen 151 and function execution unlock for "TOM" contact address UI object 33*a* and it displays a message window, as shown in FIG. 14 (*b*).

Here, once the user completes message-creation on the message window, the controller 180 transmits the created message to "TOM."

Figure 15:
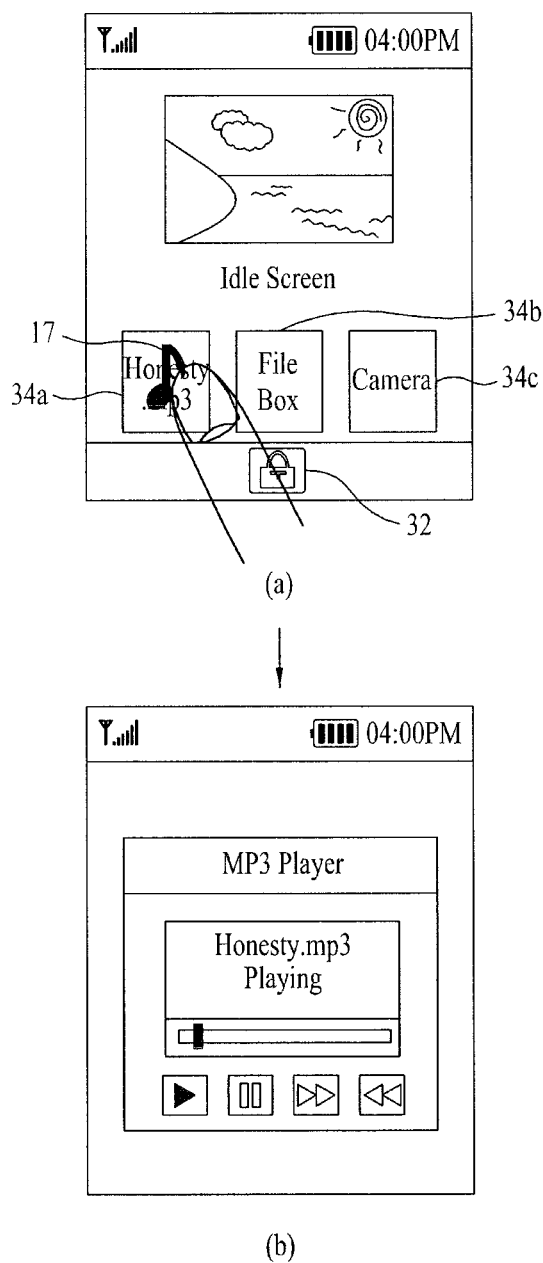

FIG. 15 (*a*) illustrates "Honesty.mp3," "file box" and "camera" UI objects 34*a*, 34*b* and 34*c*, which are different-category menu functions, are displayed on the idle-screen of the touch-locked touchscreen 151.

When recognizing a touch gesture having a predetermined pattern 17 on "Honesty.mp3" UI object 34*a*, the controller 180 searches a touch gesture having an identical pattern to the recognized pattern 17 in the memory 160, as shown in FIG. 15 (*a*).

At this time, the input pattern 17 shown in FIG. 15 (*a*) is identical to the fifth pattern of the fifth touch gesture 17 set in the memory 160 as shown in FIGS. 4 and 5. as a result, the controller 180 implements touch-unlock for the touchscreen 151 and function execution unlock for "Honesty.mp3" UI object 34*a* and it drives MP3 application provided in the memory 160 to play "Honesty.mp3" file, as shown in FIG. 15 (*b*).

Figure 16:
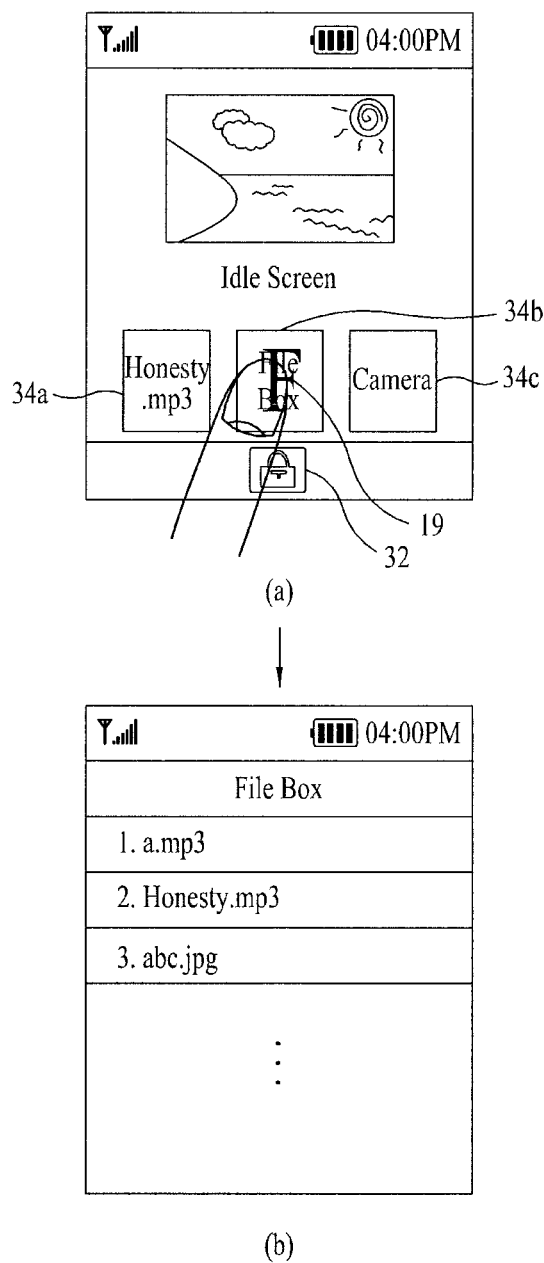

FIG. 16 (*a*) illustrates that the user inputs a touch gesture having a predetermined pattern 19 on "file box" menu object 34*b*.

At this time, the pattern 19 of the touch gesture inputted from the user is identical to the seventh pattern of the seventh touch gesture 19 set in the memory 160 as shown in FIGS. 4 and 5. as a result, the controller 180 implements touch unlock for the touchscreen 151 and function execution unlock for "file box" menu UI object 34*b* and it displays a list of files stored in the file box provided in the memory 160.

Figure 17:
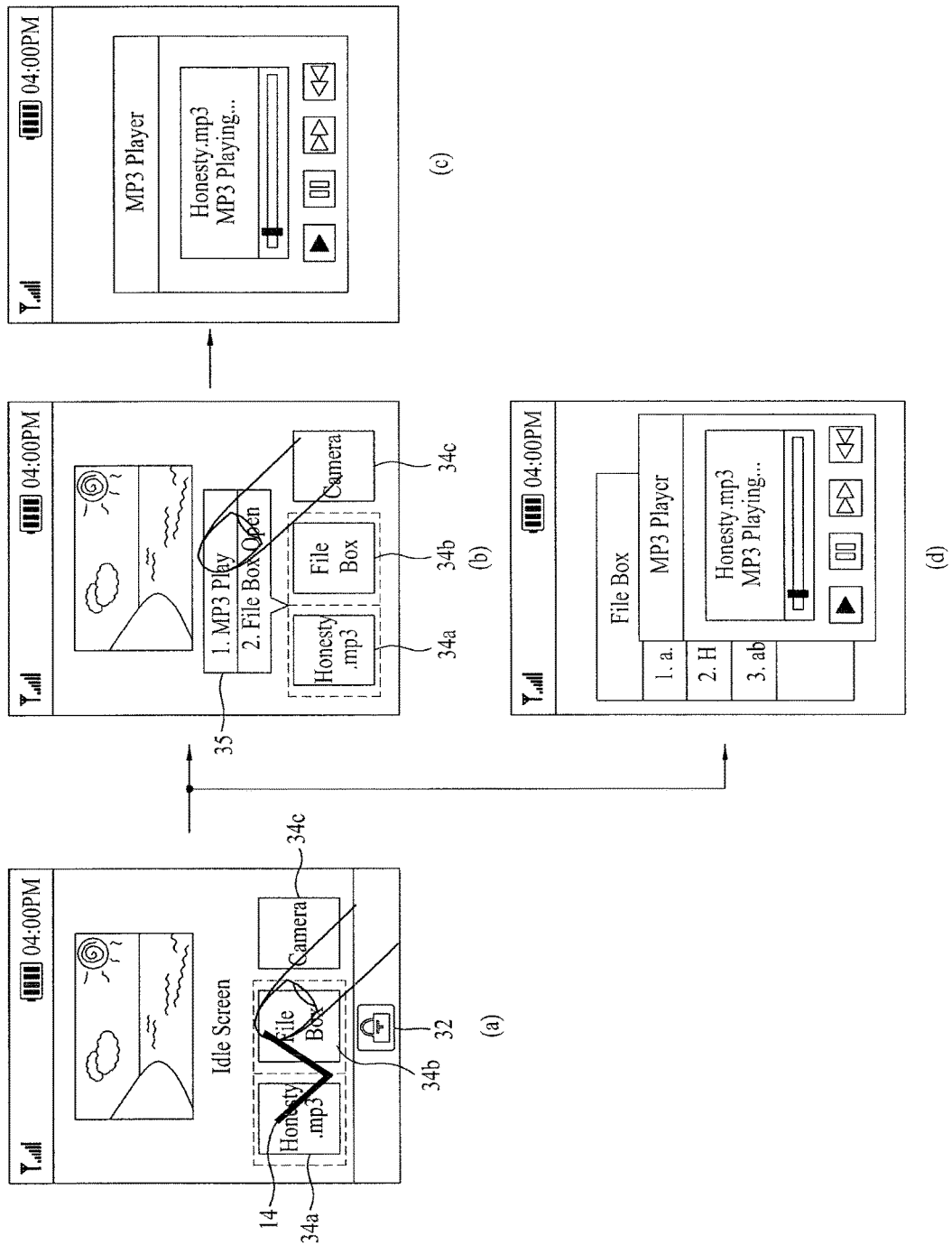
Figure 18:
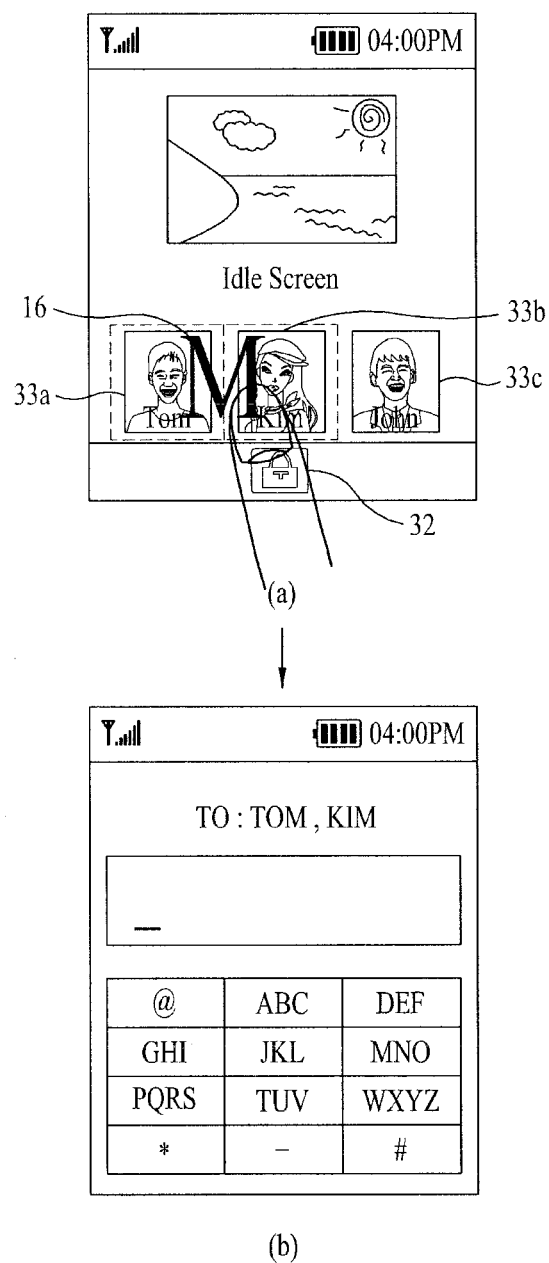

FIGS. 17 and 18 illustrates a process of touch-lock and function-execution unlock and function execution for UI objects, in case a touch gesture is input on a plurality of UI objects displayed on the touch-locked touchscreen 151.

Specifically, FIG. 17 (a) illustrates that the user inputs a touch gesture having a predetermined pattern 14 on "Honesty.mp3" and "file box" UI objects 34a and 34b.

That is, the controller 180 recognizes the pattern of the input touch gesture in the memory 160 and it searches a touch gesture having an identical pattern to the recognized pattern 14.

At this time, the recognized pattern 14 of the touch gesture is identical to the second pattern of the second touch gesture 14 set in the memory 160 shown in FIGS. 4 and 5. as a result, the controller 180 implements touch unlock for the touchscreen 151 and function execution unlock for "Honesty.mp3" and "file box" UI objects 34a and 34b located in a region where the pattern 14 is recognized on the touchscreen 141 and it executes the functions of "Honesty.mp3" and "file box" UI objects 34a and 34b, as shown in FIGS. 17 (b) to (d).

As shown in FIG. 17 (b), the controller 180 displays a list 35 of functions of "Honesty.mp3" and "file box" UI objects 34a and 34b on the touchscreen 151. when "MP3 playing" is selected from the list, the controller 180 drives MP3 application provided in the memory 160 and it plays "Honesty.mp3" 34a, as shown in FIG. 17 (c).

As shown in FIG. 17 (d), the controller executes the functions of "Honesty.mp3" and "file box" UI objects 34a and 34b and it displays each of function execution screens on a single screen of the touchscreen 151.

FIG. 18 (a) illustrates that "TOM," "KIM" and "JOHN" contact address UI objects 33a, 33b and 33c, which are identical-category menu functions, are displayed on the idle-screen of the touch-locked touchscreen 151.

As shown in FIG. 18 (a), when recognizing a touch gesture having a predetermined pattern 16 on "TOM" and "KIM" contact address UI objects 33a and 33b, the controller 180 searches a touch gesture having an identical pattern to the recognized pattern 16 in the memory 160.

At this time, the input pattern shown in FIG. 18 (a) is identical to the fourth pattern of the fourth touch gesture set in the memory 160 shown in FIGS. 4 and 5. as a result, the controller 180 implements touch unlock for the touchscreen 151 and function execution unlock for "TOM" and "KIM" contact address UI objects 33a and 33b and it displays a message window to create a message to send to "TOM" and "KIM", as shown in FIG. 18 (b).

Here, once the user completes message creation via the message window, the controller 180 transmits the completed message to "TOM" and "KIM."

Next, FIGS. 19 to 22 illustrates examples of a process for touch-lock and function-execution-unlock and function execution for UI objects in case a touch gesture is input on a region where UI objects are not displayed on the touch-locked touchscreen 151.

Figure 19:
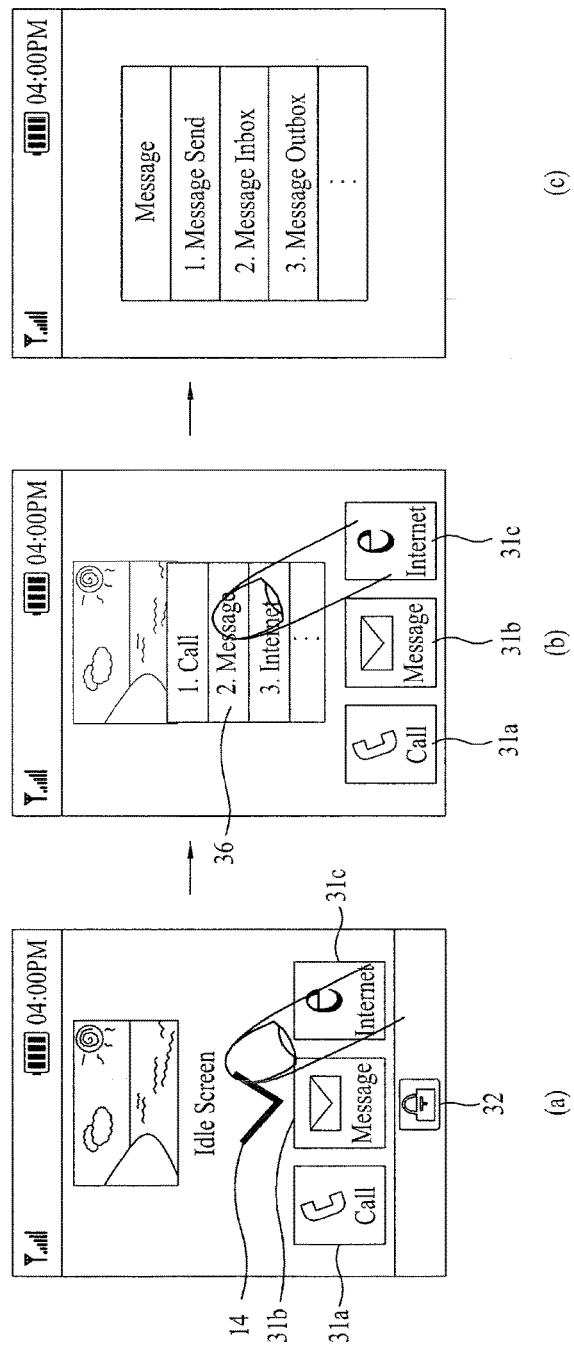

Specifically, FIG. 19 (a) illustrates that "call" UI object 31a, "message" UI object 31b and "internet" UI object 31c, which are different-category menu functions, are displayed on the idle-screen of the touch-locked touchscreen 151 and that the user inputs a touch gesture having a predetermined pattern 14 on a region where the UI objects 31a, 31b and 31c are not displayed.

At this time, the pattern of the touch gesture inputted from the user is identical to the second pattern of the second touch gesture 14 set in the memory 160 shown in FIGS. 4 and 5. as a result, the controller 180 implements touch unlock for the touchscreen 151 and function execution unlock for the UI objects 31a, 31b and 31c having the locked function execution on the touchscreen 151. after that, the controller 180 displays a list 36 of functions of UI objects 31a, 31b and 31c able to be executed on the touchscreen 151, as shown in FIG. 19 (b).

When the user selects "message" function, the controller executes a message menu on the touchscreen 151 as shown in FIG. 19 (c).

Figure 20:
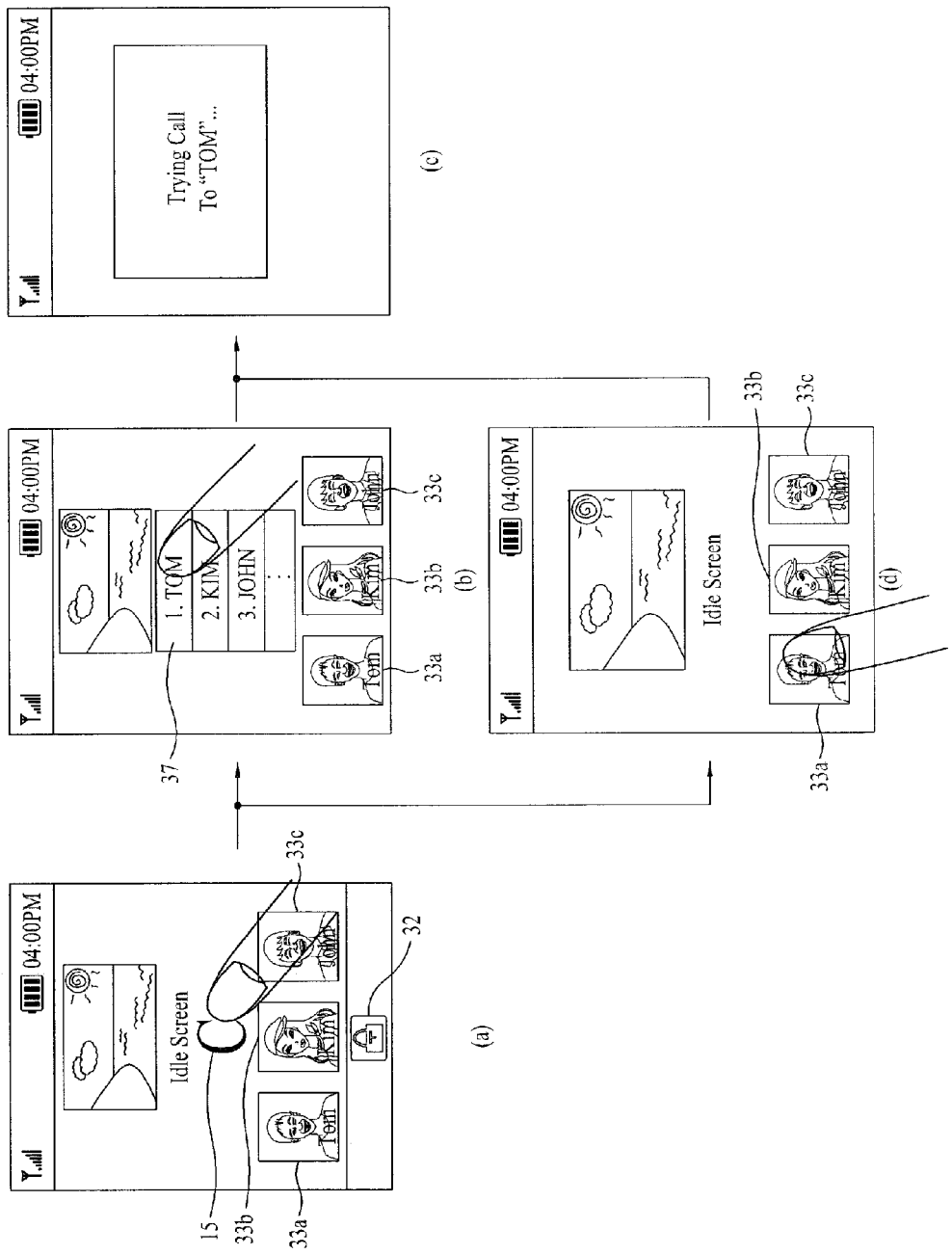

FIG. 20 (a) illustrates that "TOM" contact address UI object 33a, "KIM" contact address UI object 33b and "JOHN" contact address UI object 33c, which are identical-category menu functions, are displayed on the idle-screen of the touch-locked touchscreen 151 and that the user inputs a touch gesture having a predetermined pattern 15 on a region where the contact address UI objects 33a, 33b and 33c are not displayed on the touchscreen 151.

At this time, the pattern 15 of the touch gesture inputted from the user is identical to the third pattern of the third touch gesture 15 set in the memory 160 shown in FIGS. 4 and 5. as a result, the controller 10 implements touch unlock for the touchscreen 151 and function execution unlock for the contact address UI objects 33a, 33b and 33c having the locked function execution on the touchscreen 151. after that, the controller 180 displays a list 37 of functions of the contact address UI objects 33a, 33b and 33c able to be executed on the touchscreen 151, as shown in FIG. 20 (b).

As shown in FIG. (c), when "TOM" contact address is selected, the controller 180 controls the wireless communication unit to tray connecting to a telephone number configured in "TOM" contact address.

As shown in FIG. 20 (d), the controller 180 may not display the function list 37 shown in FIG. 20 (c).

When the user selects "TOM" contact address UI object 33a out of the function-execution-unlocked contact address UI objects 33a, 33b and 33c, the controller 180 controls the wireless communication unit to try connecting to a telephone configured in "TOM" contact address, as shown in FIG. 20 (c).

Figure 21:
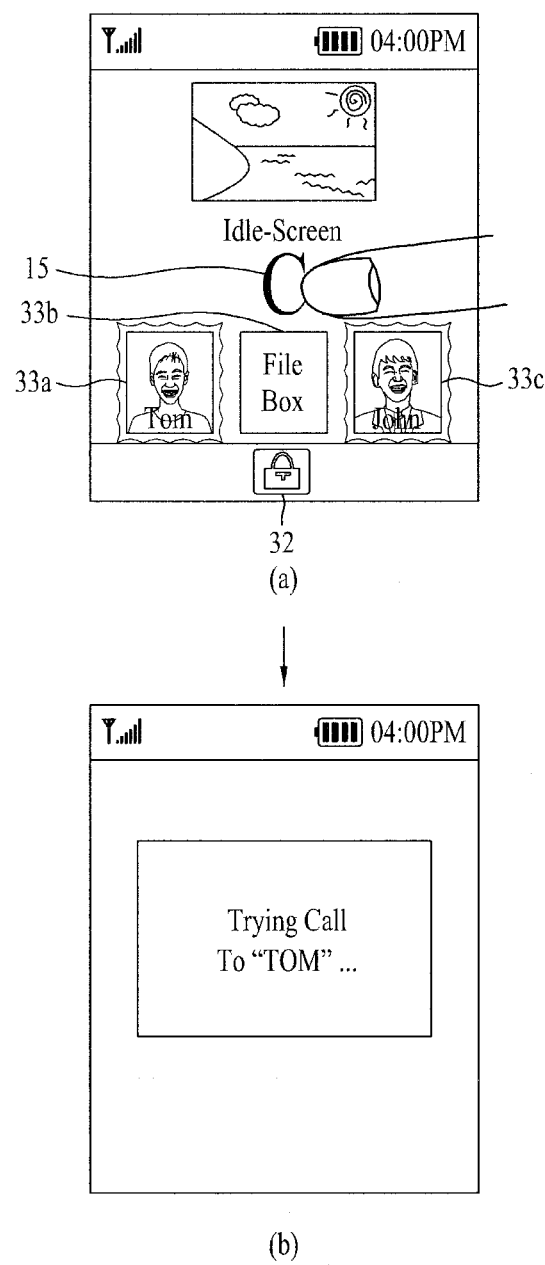

FIG. 21 (a) illustrates that "TOM" contact address UI object 33a, "file box" menu object 34b and "JOHN" contact address UI object 33c, which are different-category menu functions, are displayed on the idle-screen of the touch-locked touchscreen 151 and that the user inputs a touch gesture having a predetermined pattern 15 on a region where the UI objects 33a, 34b and 33c are not displayed on the touchscreen 151.

At this time, the pattern 15 of the touch gesture inputted from the user is identical to the third pattern of the third touch gesture set in the memory 160 shown in FIGS. 4 and 5. As a result, the controller 180 implements touch-unlock for the touchscreen 151 and function execution unlock for the UI objects 33a, 34b and 33c.

Since "call" function is mapped to the third touch gesture 15 set in the memory 160, the controller 180 searches UI objects 33a and 33c related to "call" out of the UI objects 33a, 34b and 33c and it displays the searched "TOM" contact address UI object 33a and "JOHN" contact address UI object 33c after differentiating the searched UI objects from "file box" menu object 34b, as shown in FIG. 21 (a).

That is, the controller 180 differentiates and displays "TOM" contact address UI object 33a and "JOHN" contact address UI object 33c related to "call" out of the UI objects 33a, 34b and 33c from "file box" menu object 34b. Because of that, the user may notice the UI objects 33a and 33c related to the touch gesture 15 inputted by himself or herself on the touchscreen 151.

Here, the controller may differentiate transparency of "TOM" contact address UI object 33a and "JOHN" contact address UI object 33c from "file box" menu object 34b to make them distinguishable. Alternatively, the controller 180 may displays a highlight, underline and background color to "TOM" contact address UI object 33a and "JOHN" contact address UI object 33c to make them distinguishable from the other "file box" menu object 34b. Alternatively, the controller 180 may highlights an edge of "TOM" contact address UI object 33a and "JOHN" contact address UI object 33c or change a color, shape and characteristic of text of these objects, to make them distinguishable from "file box" menu object 34b. Also, the controller 180 may enlarge the sizes of the "TOM" contact UI object 33a and "JOHN" contact address UI object 33c to make these objects distinguishable from "file box" menu object 34b.

In the meanwhile, when the user selects "TOM" contact address UI object 33a as shown in FIG. 21 (a), the controller controls the wireless communication unit to try calling to a telephone configured in "TOM" contact address, as shown in FIG. 21 (b).

Figure 22:
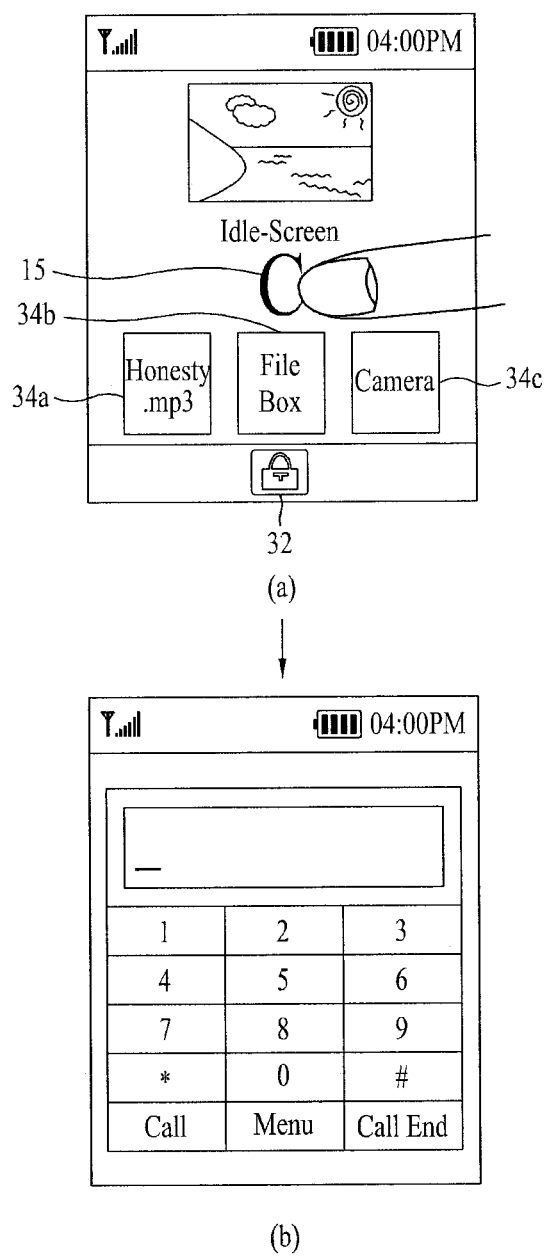

Next, FIG. 22 (a) illustrates that "Honesty.mp3" UI object 34a, "file box" UI object 34b and "camera" menu UI object 34c, which are different-category menu functions, are displayed on the idle-screen of the touch-locked touchscreen 151 and that the user inputs a touch gesture having a predetermined pattern 15 on a region where the UI objects 34a, 34b and 34c are not displayed on the touchscreen 151.

At this time, the pattern 15 of the touch gesture inputted from the user is identical to the third pattern of the third touch gesture 15 set in the memory 160 shown in FIGS. 4 and 5. as a result, the controller 180 implements touch unlock for the touchscreen 151 and function execution unlock for the UI objects 33a, 34b and 33c.

Since "call" function is mapped to the third touch gesture 15 set in the memory 160, the controller 180 searches UI objects related with "call" out of the UI objects 34a, 34b and 33c, as shown in FIG. 22 (a).

According to FIG. 22 (a), there is no UI object related with "call." Because of that, the controller displays a telephone number input window to try calling on the touchscreen 151 as shown in FIG. 22 (b).

the first embodiment of the present invention mentioned above presents the process configured to implement touch unlock for the touchscreen 151, function execution unlock for UI object and function execution for the UI object by way of the touch gesture.

As follows, a second embodiment of the present invention will be described in reference to FIGS. 23 to 34. according to the second embodiment, when a touch gesture is input on the touchscreen 151, functions, information and menu icons registered in the touch gesture are displayed in predetermined arrangement near the input touch gesture such that the user may display and use functional icons and favorite menus to use simply by way of the touch gesture, without complex menu operations.

Second Embodiment

Figure 23:
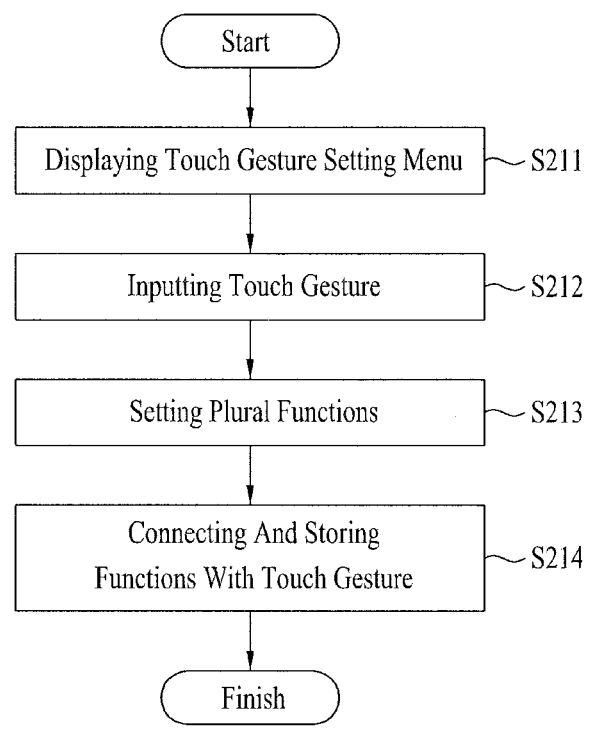
FIG. 23 is a flow chart illustrating a touch gesture setting process according to another embodiment of the present invention.

FIG. 23 is a flow chart illustrating a method for setting a touch gesture according to the second embodiment of the present invention.

Figure 24:
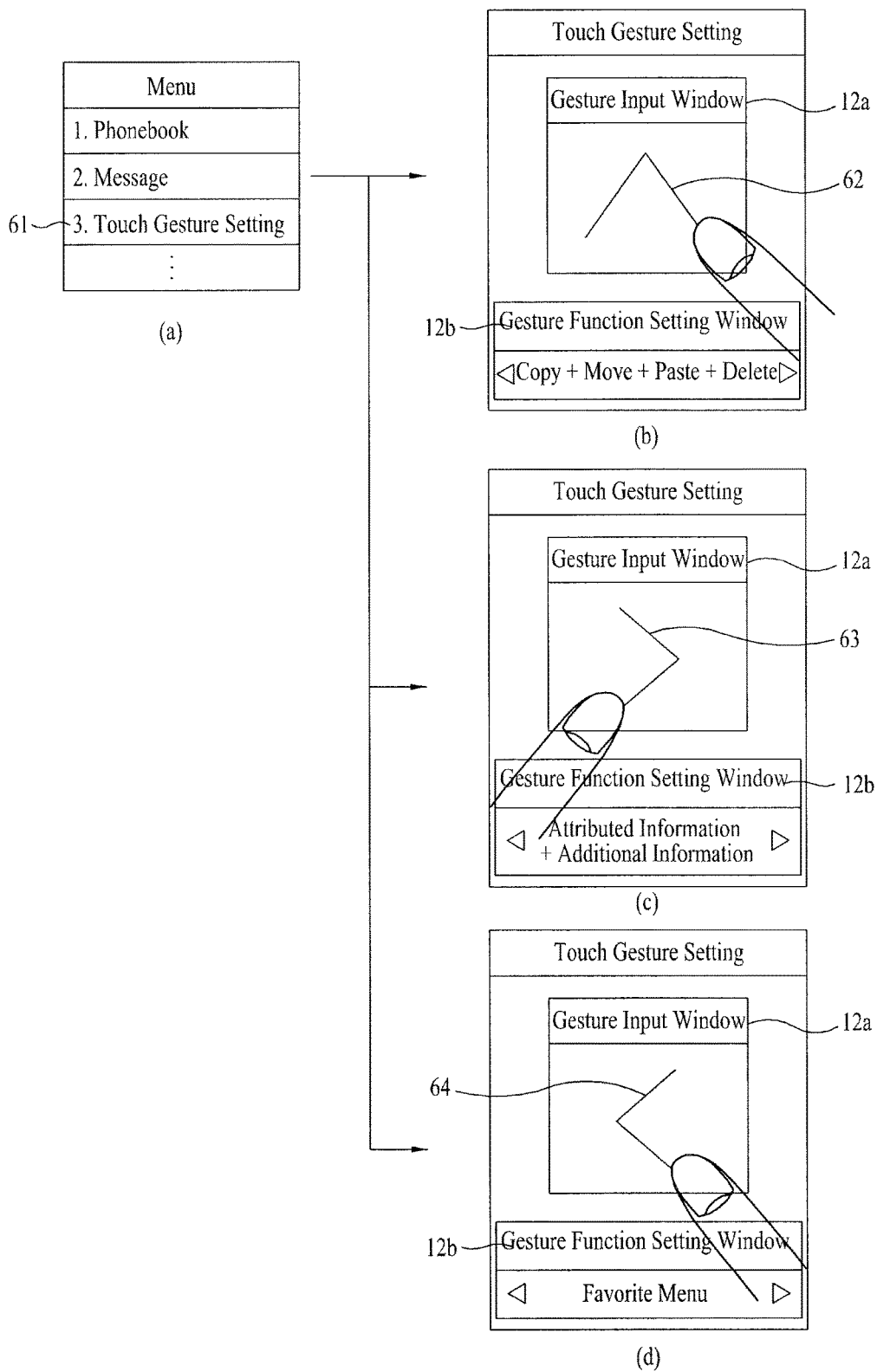
FIGS. 24 and 25 are diagrams of screens illustrating the touch gesture setting process according to the above embodiment of the present invention.
Figure 25:
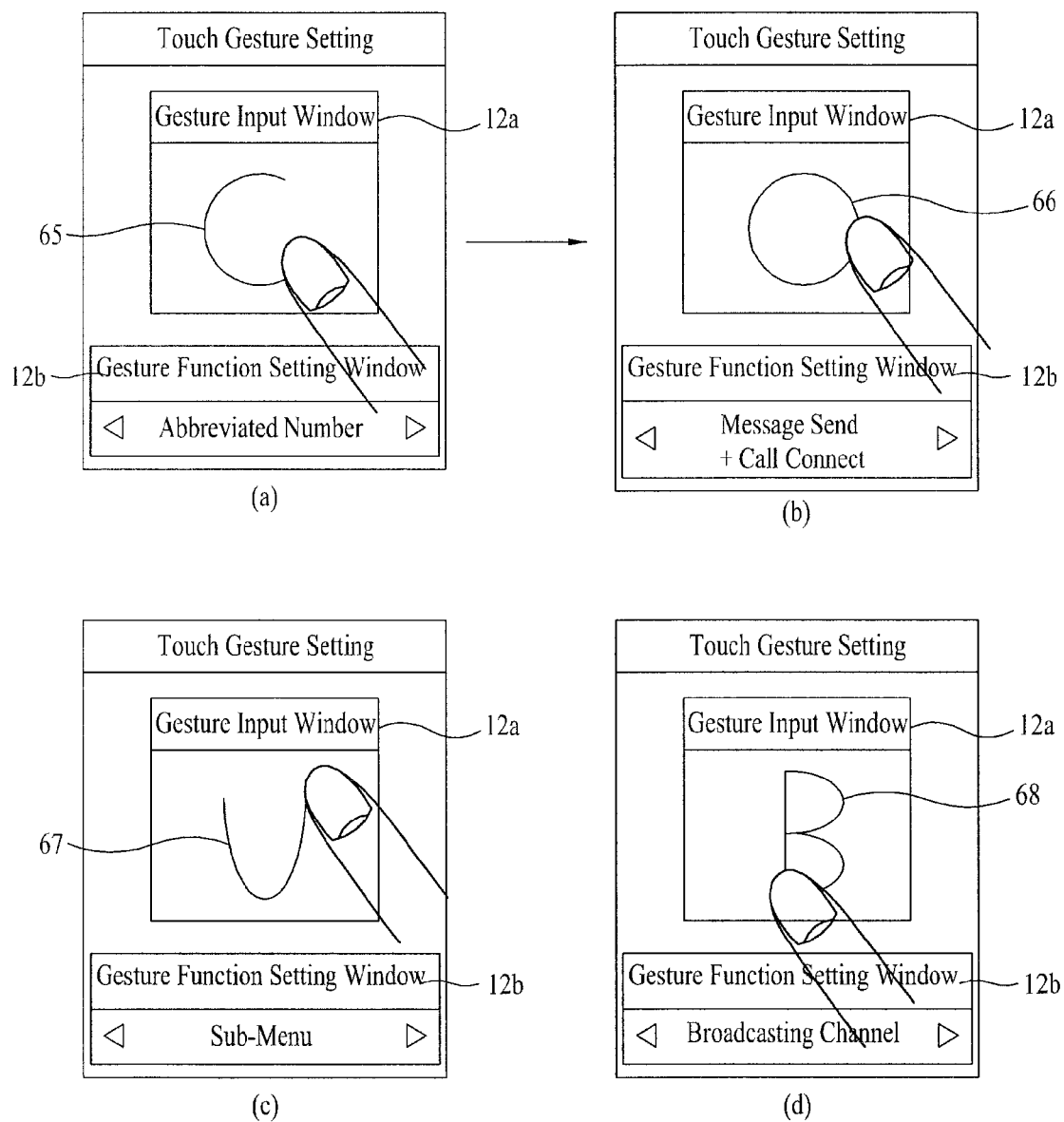

FIGS. 24 and 25 are diagrams of screens illustrating the method for setting the touch gesture according to the second embodiment of the present invention.

As follows, a process of setting a touch gesture in which a plurality of functions configured of a controller 180 are registered according to the second embodiment will be described in reference to FIGS. 22 to 25.

First of all, as shown in FIG. 23, when the user selects a touch gesture setting menu according to the second embodiment of the present invention via a touchscreen 151, the controller 180 of a mobile terminal 100 displays a touch gesture setting menu on the touchscreen 151 [S212].

When the user inputs a touch gesture having a predetermined pattern [S212] and set a plurality of functions to be connected with the input touch gesture on the touch gesture setting [S213], the controller 180 connects the set functions with the pattern of the touch gesture to store in a memory 160 [S214].

That is, when "3. Touch gesture setting" menu 61 is selected as shown in FIG. 24 (a), the controller 180 displays a gesture input window 12a and a gesture function setting window 12b as shown in FIG. 24(b).

FIG. 24 (b) illustrates that a first touch gesture 62 having a first pattern ("∧") is inputted from the user and that "copy", "move", "paste" and "delete" functions are set in the gesture function setting window 12b.

At this time, the user may contact-touch the first pattern ("∧") of the first touch gesture 62 to input to the touchscreen 151 or proximity-touch the first pattern ("∧") to a proximity sensor 141 provided in the touchscreen 151 to input. The touch module which will be described as follows includes both of "contact-touch" and "proximity-touch."

In the meanwhile, the controller 180 maps "copy", "move", "paste" and "delete" functions set as shown in FIG. 24 (b) with the first touch gesture 62 and it stores the result of the mapping in the memory 160.

For example, in case contents are displayed on a idle-screen or menu-screen of the touchscreen 151, with the first touch gesture 62 shown in FIG. 24 (b) being set in the memory 160, the controller recognizes a touch gesture identical to the first touch gesture on the contents from the user. After that, the controller displays UI objects representing "copy," "move," "paste" and "delete" functions mapped with the first touch gesture on the contents. When one of the UI objects is selected, the controller may apply a function corresponding to the UI object to the contents.

The functions able to be set in the gesture input window 12a may be configured of Copy, Move, Paste, Delete, Wallpaper, Hide, Show, Zoom in, Zoom out, Attach, Capture, Recording, Add, Edit, View, Sort and Search functions of contents displayed on the idle-screen or menu-screen of the touchscreen 151 and they may be configured of specific information, auxiliary information and execution information of the contents.

Also, the functions able to be set in the gesture input window 12a may be configured of option-menus, user's favorite menus, favorite broadcasting channels, abbreviated numbers configured to try call, web bookmarks and the like.

That is, the user may set all of functions and menu functions required to control operations of all the contents provided in the mobile terminal 100 via the gesture input window 12a.

At this time, the contents may include texts, images, received messages, contact information of a phonebook, audio files, image files, motion picture files, game files, schedule information, text files, electronic dictionary files, calculator files and webpage address information. That is, the contents may include all of the data existing in the menu-function of the mobile terminal 100. The contact information may be configured of a mobile phone number, name, residence phone number and e-mail address.

FIG. 24 (c) illustrates that a second touch gesture 63 having a second pattern (">") is inputted from the user via the gesture input window 12a and that "attribute information" and "additional information" functions are set in the gesture function setting window 12b.

Figure 28:
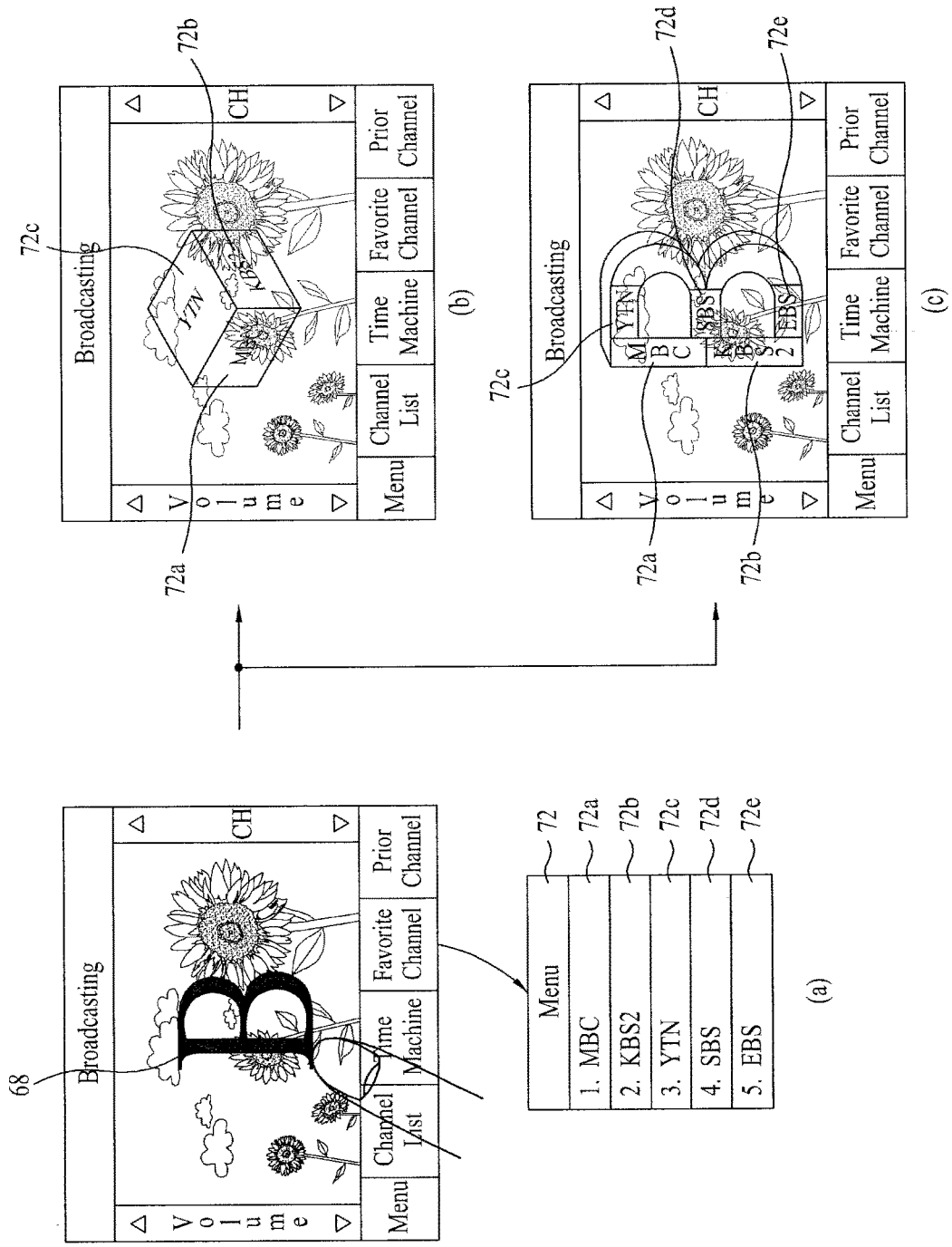

The controller 180 connects "attribute information" and "additional information" set as shown in FIG. 28 (c) with the second touch gesture and it stores the result of connection in the memory 160.

For example, in case contents are displayed on the idle-screen or menu-screen of the touchscreen 151, with the second touch gesture 63 shown in FIG. 28 (c) being set in the memory 160, the controller 180 recognizes a touch gesture identical to the second touch gesture on the contents. After that, the controller displays UI objects representing "attribute information" and "additional information" connected with the first touch gesture 62. When one of the UI objects is selected, the controller 180 displays information corresponding to the UI object.

At this time, this "attribute information" and "additional information" may be information related with the set contents or menu or it may be information related with contents having the touch gesture input therein.

Next, FIG. 24 (d) illustrates that a third touch gesture 64 having a third pattern ("<") is inputted from the user and that "favorite menu" function is set in the gesture function setting window 12b.

The controller 180 maps "favorite menu" menu set as shown in FIG. 28 (c) with the third touch gesture 64 to store in the memory 160.

For example, when recognizing a touch gesture identical to the third touch gesture 64 on the idle-screen or menu-screen of the touchscreen 151 in case the third touch gesture 64 shown in FIG. 24 (d) is set in the memory 160, the controller 180 displays UI objects representing "favorite menu" functions connected with the third touch gesture 64. When one of the UI objects is selected, the controller 180 executes a menu corresponding to the UI object. Here, this "favorite menu" means favorite menus preset by the user.

Next, FIG. 25 (a) illustrates that a fourth touch gesture 65 having a fourth pattern ("C") is inputted from the user and that "abbreviated number" function is set in the gesture function setting window 12b.

The controller 180 connects "abbreviated number" function set as shown in FIG. 25 (a) with the fourth touch gesture 65 to store in the memory 160.

As follows, "abbreviated number" described in the present specification will be explained in reference to TABLE 1.

TABLE 1

| Abbreviated Number | Name | Phone number |
|---|---|---|
| 1 | SAM | 010-111-xxx2 |
| 2 | KIM | 010-112-xxx3 |
| 3 | LEE | 010-112-xx21 |

As shown in TABLE 1, the "abbreviated number" is a shortcut configured for call-connecting and it means that a specific number is connected with someone's telephone number.

In reference to TABLE 1, when the user inputs a abbreviated number "1" for a short or long time period, the controller 180 searches "010-111-xxx2" connected with the abbreviated number "1" from the phonebook provided in the memory 160 and it controls the wireless communication unit 110 to try calling to the searched telephone number "010-111-xxx2".

When recognizing a touch gesture identical to the fourth touch gesture 65 on the idle-screen or menu-screen of the touchscreen 151 in case the fourth touch gesture 65 shown in FIG. 25 (a) is set in the memory 160, the controller 180 displays UI objects representing "abbreviated numbers" connected with the fourth touch gesture 65 on the idle-screen or menu-screen. After that, when one of the UI objects is selected, the controller 180 tries calling to a telephone number mapped with "abbreviated number" corresponding to the UI object.

Next, FIG. 25 (b) illustrates that a fifth touch gesture 66 having a fifth pattern ("○") is inputted from the user via the gesture input window 12a and that "message send" and "call connection" functions are set in the gesture function setting window 12b.

The controller 180 connects "message send" and "call connection" functions set as shown in FIG. 25 (b) with the fifth touch gesture 66 to store in the memory 160.

For example, in case contact information is displayed on the idle-screen or menu-screen of the touchscreen 151, with the fifth touch gesture 66 shown in FIG. 25 (b) being set in the memory 160, the controller 180 recognizes a touch gesture identical to the fifth touch gesture 66 on the contact information inputted from the user. After that, the controller 180 displays UI objects representing "message send" and "call connection" connected with the fifth touch gesture 66 on the contact information. When "call connection" UI object is selected out of the UI objects, the controller 180 tries calling to the contact information.

Next, FIG. 25 (c) illustrates that a sixth touch gesture 67 having a sixth pattern ("∪") is inputted from the user via the gesture input window 12a and that "sub-menu" function is set in the gesture function setting window 12b.

Figure 29:
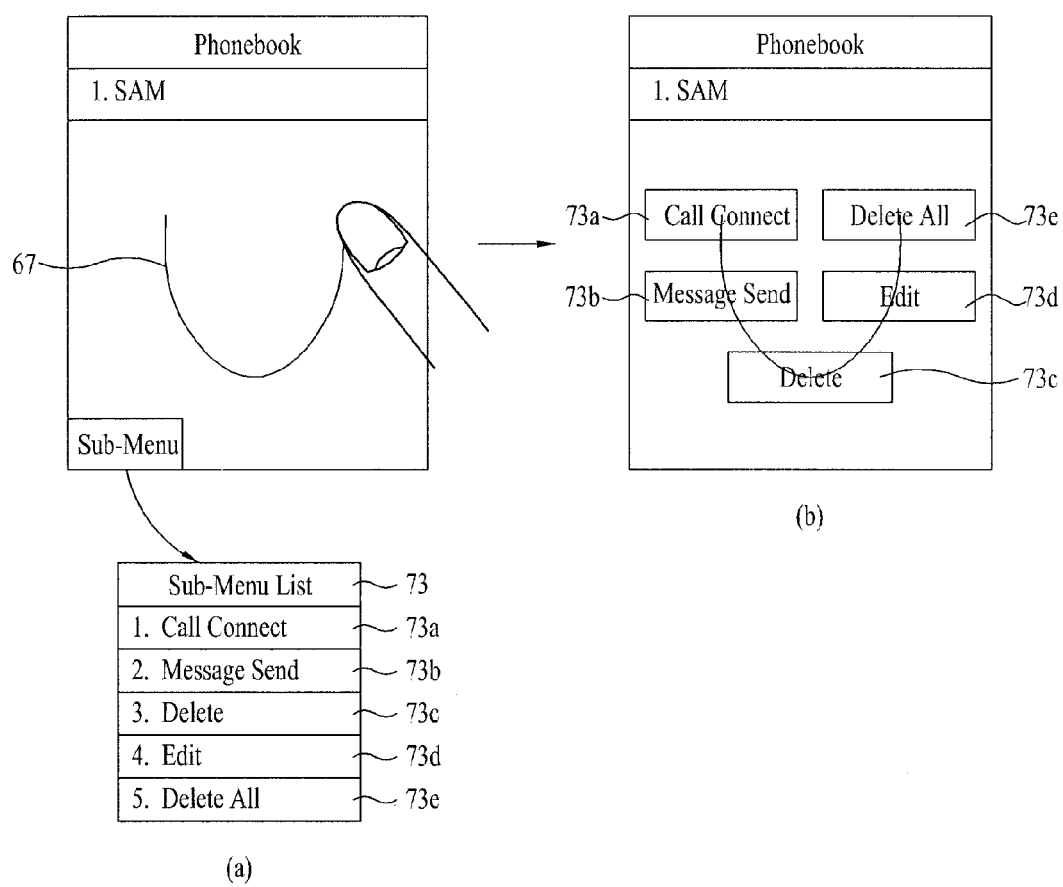

The controller 180 connects "sub-menu" function set as shown in FIG. 29 (c) with the sixth touch gesture 67 to store in the memory 160.

For example, in case a specific menu is displayed on the touchscreen 151, with the sixth touch gesture 67 shown in FIG. 25 (C) being set in the memory 160, the controller 180 recognizes a touch gesture identical to the sixth touch gesture inputted from the user on the contact information and after that it displays UI objects representing "sub-menus" of the menu on the menu. When a specific "sub-menu" UI object is selected out of the UI objects, the controller 180 executes the selected "sub-menu."

Next, FIG. 25 (d) illustrates that a seventh touch gesture 68 having a seventh pattern ("B") is inputted from the user via the gesture input window 12a and that "favorite broadcasting channel" function is set in the gesture function setting window 12b.

The controller 180 connects "favorite broadcasting channel set as shown in FIG. 28 (d) with the seventh touch gesture 68 to store in the memory 160.

For example, in case a broadcasting playing screen is displayed on the touchscreen 151, with the seventh touch gesture 68 shown in FIG. 25 (d) being set in the memory 160, the controller 180 recognizes a touch gesture identical to the seventh touch gesture on the broadcasting playing screen and it displays UI objects representing "favorite broadcasting channels" connected with the seventh touch gesture 68 on the broadcasting playing screen. When one of the UI objects is selected, the controller 180 receives a broadcasting program of a broadcasting channel corresponding to the UI object to display a playing screen of the broadcasting program.

At this time, "favorite broadcasting channel" means favorite broadcasting channels preset by the user.

The process of setting the touch gesture according to the second embodiment of the present invention is described in detail in reference to FIGS. 23 to 26.

As follows, an operational process of the mobile terminal 100 by using the touch gesture according to the second embodiment of the present invention will be described in reference to FIGS. 27 to 34.

Figure 26:
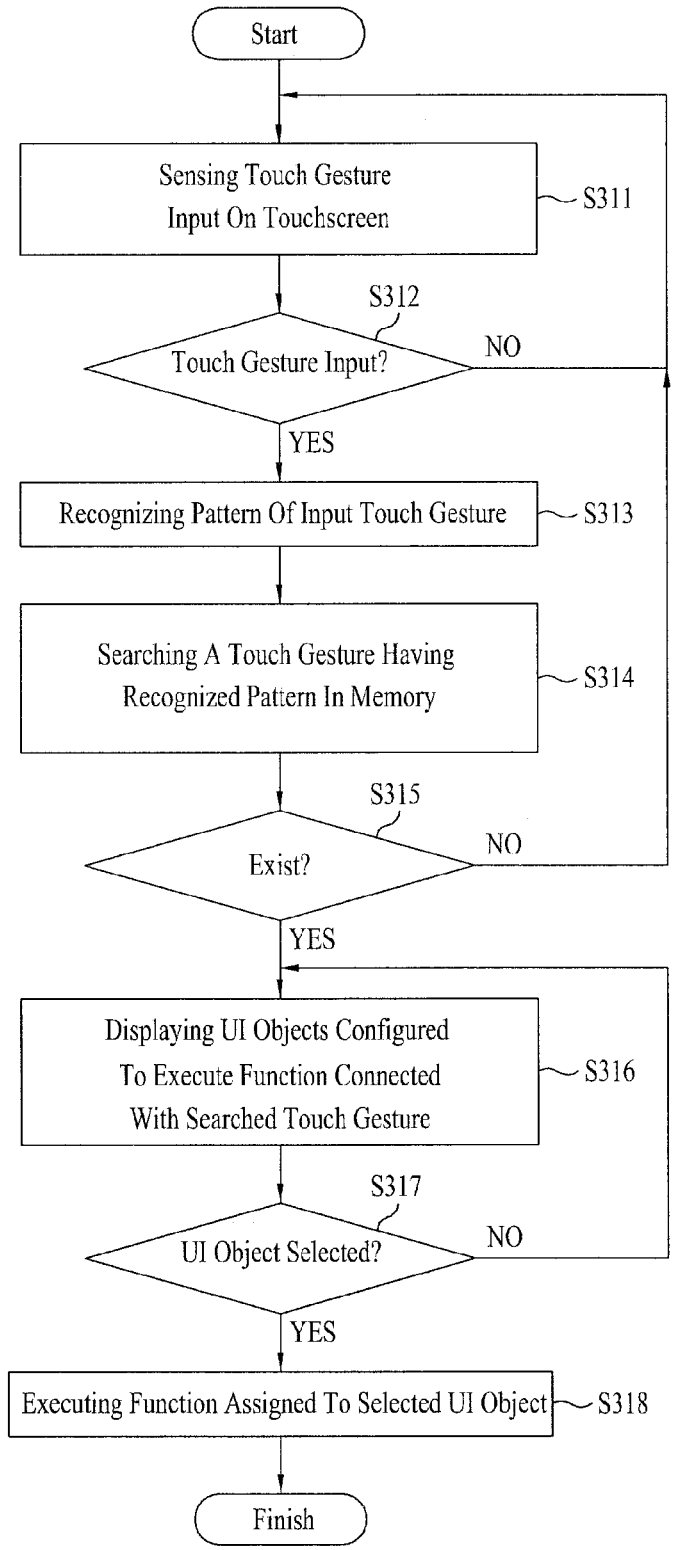
FIG. 26 is a flow chart illustrating a method for controlling a mobile terminal by way of the touch gesture according to the embodiment.

FIG. 26 is a flow chart illustrating a method for controlling the mobile terminal by way of the touch gesture according to the second embodiment of the present invention.

FIGS. 27 to 34 are diagrams of screens to illustrate the operational control process of the mobile terminal by way of the touch gesture according to the second embodiment of the present invention.

In reference to FIG. 26, a controller 180 of the mobile terminal 100 senses whether a touch gesture having a predetermined pattern is inputted from the user on a touchscreen 151 displaying an idle-screen or menu-screen [S311].

At this time, when the touch gesture having the predetermined pattern is sensed on the touchscreen 151 based on the result of the sensing[S312], the controller 180 recognizes the pattern of the touch gesture input via the touchscreen 151 [S313].

The controller 180 searches a touch gesture having an identical pattern to the pattern of the recognized touch gesture in the memory 160 [S314]. When the touch gesture having the identical pattern to the pattern of the recognized touch gesture is searched [S315], the controller 180 displays UI objects to execute a plurality of functions connected with the touch gesture searched in the memory 160 [S316].

Here, in S316, the controller 180 may sort the UI objects based on usage frequency, importance and preference priority preset by the user display the sorted UI objects adjacent to the input touch gesture.

Also, in the step S316, the controller 180 may display the UI objects adjacent to the input touch gesture in one of grid, list, random, pile and messy style.

Alternatively, the controller 180 displays a three-dimensional polyhedron shape such as cube near the input touch gesture and it may display each of the UI objects on each facet of the three-dimensional polyhedron. Here, three facets of the three-dimensional polyhedron are displayed on the screen and the user may rotate the three-dimensional polyhedron to see UI objects displayed on the other facets invisible currently.

Alternatively, the controller 180 may sort the UI objects based on the patterns of the touch gestures at the location of the input touch gesture to display the sorted UI objects.

In the meanwhile, when one of the UI objects is selected by the user [S317], the controller 180 executes a function corresponding to the selected UI object [S318].

As follows, the process of controlling the operation of the mobile terminal 100 by using the touch gesture according to the second embodiment of the present invention will be described in more detail in reference to FIGS. 27 to 34.

First of all, when the touch gesture according to the second embodiment of the present invention is recognized on the touchscreen 151, a process of displaying functions mapped with the recognized touch gesture will be described in detail in reference to FIGS. 27 to 29.

Figure 27:
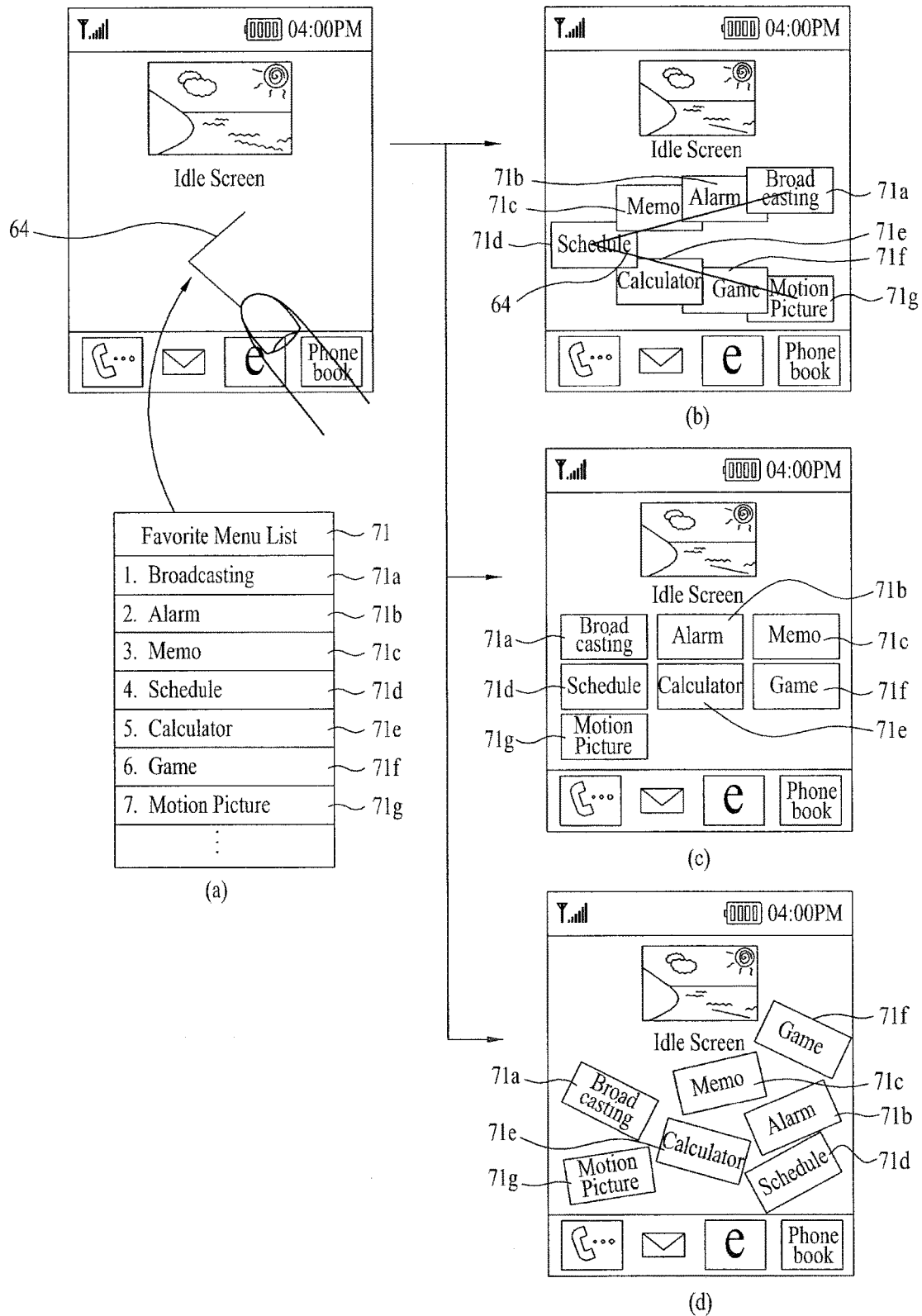

FIG. 27 (*a*) illustrates that a touch gesture having a predetermined pattern ("<") 64 is inputted on an idle-screen displayed on the touchscreen 151 from the user.

At this time, the pattern 64 of the touch gesture inputted from the user is identical to the third pattern of the third touch gesture 64 set in the memory shown in FIGS. 24 and 25 and "favorite menus" 71 are mapped with the third touch gesture set in the memory 160.

As a result, the controller 180 displays UI objects 71*a* to 71*g* representing "favorite menus" 71 mapped with the third touch gesture 64 on the idle-screen.

Here, the UI objects 71*a* to 71*g* may be displayed to be distinguishable. That is, the controller 180 displays the UI objects 71*a* to 71*g* to be colorless on the idle-screen transparently and distinguishably. Alternatively, the controller 180 displays highlights, underlines, background colors in the UI objects 71*a* to 71*g* distinguishably, or it may highlight edges of the UI objects 71*a* to 71*g*. Alternatively, the controller 180 may change a text color, shape and characteristic of the UI objects 71*a* to 71*g* distinguishably.

According to FIG. 27 (*b*), the controller 180 displays the UI objects 71*a* to 71*g* representing "favorite menus" which are sorted at a location of the pattern ("<") 64 of the input touch gesture in an appearance of the pattern ("<") 64.

Here, the UI objects 71*a* to 71*g* represented as the pattern ("<") 64 may be re-sorted according to usage frequency, importance and priority set by the user.

Moreover, when the UI objects 71*a* to 71*g* represented as the pattern ("<") 64 as shown in FIG. 27 (*b*) are displayed at the location of the pattern ("<") 64 of the touch gesture in the appearance of the pattern ("<") 64, the controller 180 may display the UI objects 71*a* to 71*g* from a touch start point to the touch last point of the touch gesture pattern ("<") 64 sequentially.

Next, according to FIG. 27 (*c*), the controller 180 displays the UI objects representing "favorite menus" on the idle-screen based on Grid style.

Lastly, according to FIG. 27 (*d*), the controller 180 displays the UI objects 71*a* to 71*g* based on Messy style.

FIG. 28 (*a*) illustrates a broadcasting playing screen on the touchscreen 151, with a touch gesture having a predetermined pattern ("B") 68 inputted by the user on the broadcasting playing screen.

At this time, the pattern 68 of the touch gesture inputted from the user is identical to the seventh pattern of the seventh touch gesture 68 set in the memory 160 shown in FIGS. 24 and 25 and "favorite broadcasting channels" 72 is mapped with the seventh touch gesture 68 set in the memory 160.

As a result, the controller 180 displays UI objects 72*b* to 72*e* representing "favorite broadcasting channels" 72 connected with the seventh touch gesture 68 on the broadcasting playing screen, as shown in FIGS. 28 (*b*) and (*c*).

Figure 32:
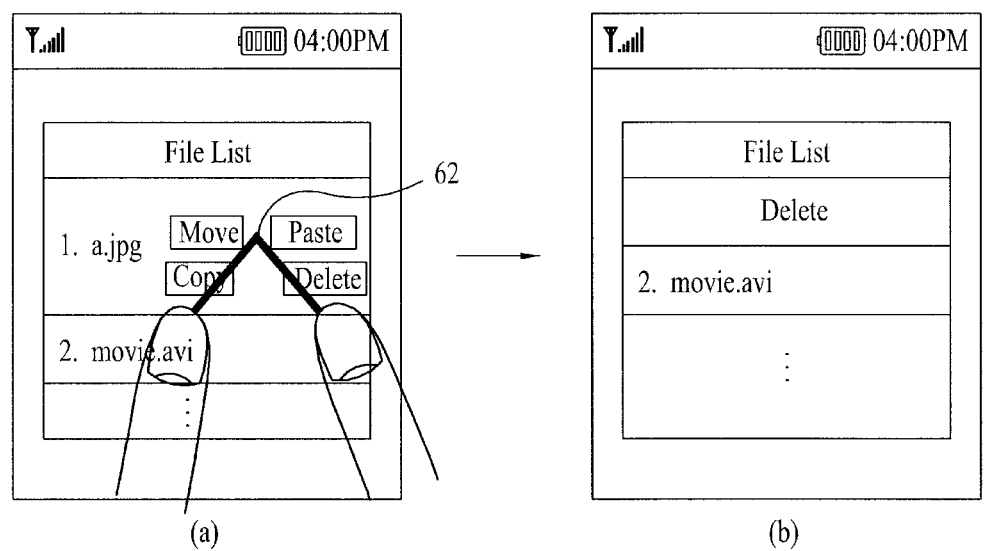

According to FIG. 32 (*b*), the controller 180 displays the UI objects 72*a* to 72*e* representing "favorite broadcasting channels" on the broadcasting playing screen in a three-dimensional polyhedron such as cube.

At this time, the three-dimensional polyhedron may be rotated by the user's upward/downward or rightward/leftward flicking to enable UI objects 72*d* and 72*e*, which are invisible on the current screen, to be visible.

According to FIG. 28 (*c*), the UI objects 72*a* to 72*e* are sorted in a location of the pattern ("B") 68 of the touch gesture in the appearance of the pattern ("B").

At this time, the controller 180 may display the UI objects 72*a* to 72*e* from a touch start point to the touch last point of the touch gesture pattern ("B") sequentially.

Next, FIG. 29 (*a*) illustrates a phonebook menu on the touchscreen 151, with a touch gesture having a predetermined pattern ("∪") inputted from the user on the phonebook menu.

At this time, the pattern 67 of the touch gesture inputted from the user is identical to the sixth pattern of the sixth touch gesture 67 set in the memory 160 shown in FIGS. 24 and 25 and "sub-menus" function 73 is mapped with the sixth touch gesture 67 set in the memory 160.

As a result, the controller 180 displays UI objects 73a to 73e representing "sub-menus" 73 connected with the sixth touch gesture 67 on the phonebook menu screen, as shown in FIG. 29 (b).

According to FIG. 29 (b), the UI objects 73a to 73e are sorted at a location of the pattern ("U") 67 of the touch gesture in the appearance of the pattern ("U") 67.

Figure 30:
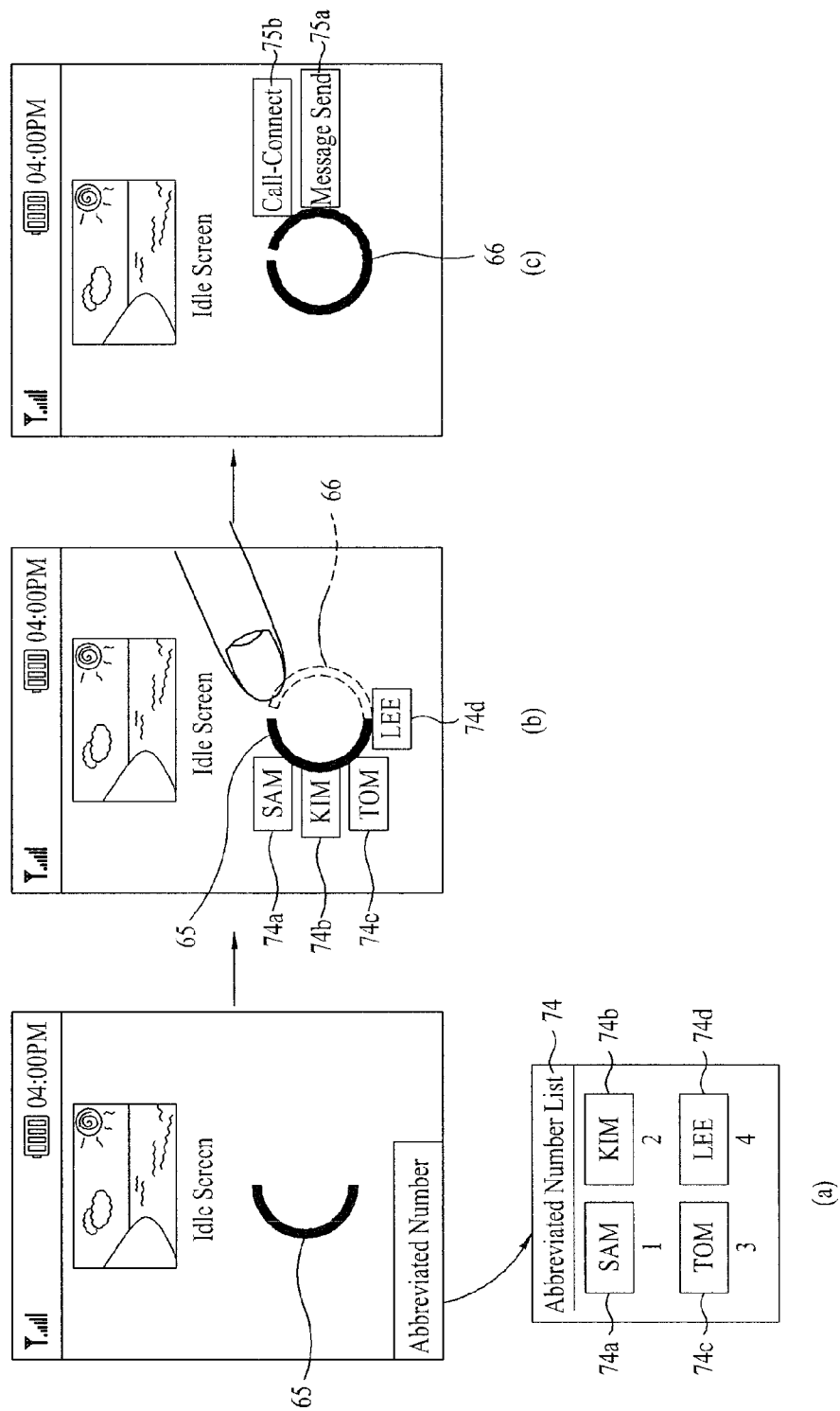

Next, FIG. 30 (a) illustrates an input fourth touch gesture having a fourth pattern with which "abbreviated number" 74 is mapped on the idle-screen of the touchscreen 151.

FIG. 30 (b) illustrates UI objects 74a to 74d representing functions of "abbreviated number" 74 mapped with the fourth touch gesture 65, which are sorted at a location of a pattern ("C") of the fourth touch gesture in an appearance of the pattern ("C"), on the idle-screen.

At this time, when the fourth pattern ("C") 65 of the fourth touch gesture is changed into a fifth pattern ("O") 66 set in the memory 160 by the user as shown in FIG. 30 (b), with UI objects 74a to 74d displayed, the controller 180 stops the display of the UI objects 74a to 74d representing the "abbreviated number" function 74 sequentially and it displays UI objects 75a and 75b representing "call connection" and "message send" mapped with the fifth pattern ("O") 66 sequentially.

Figure 31:
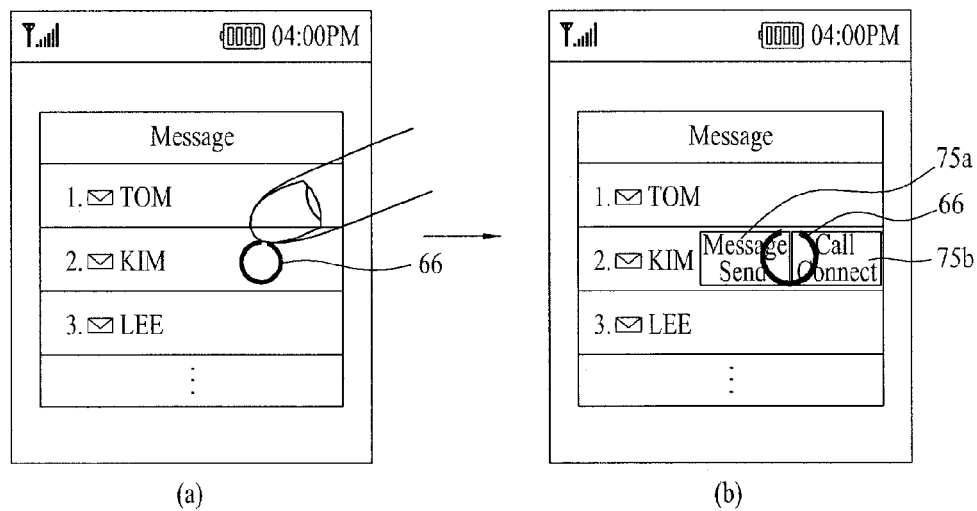

Next, FIG. 31 (a) illustrates a message list menu on the touchscreen 151, with a touch gesture having a predetermined pattern ("O") 66 inputted on a predetermined message ("2.KIM") of the message list menu screen by the user.

At this time, the pattern 66 of the touch gesture inputted from the user is identical to the fifth pattern of the fifth touch gesture 66 set in the memory 160 shown in FIGS. 24 and 25 and "call connection" and "message send" functions are mapped with the fifth touch gesture 66 set in the memory 160.

As a result, the controller 180 displays UI objects 75a and 75b representing "call connection" and "message send" connected with the fifth touch gesture 66 on a message ("2.KIM"), as shown in FIG. 31 (b).

When the user selects "call connection" UI object 75b, the controller 180 may control the wireless communication unit 110 to try calling to "2.KIM."

Next, FIG. 32 (a) illustrates a file menu list displayed on the touchscreen 151 and a touch gesture having a predetermined pattern ("∧") 62 inputted on a predetermined file ("1.a.jpg") of the file list menu screen by the user.

At this time, the pattern 62 of the touch gesture inputted from the user is identical to the first pattern of the first touch gesture 62 set in the memory 25 shown in FIGS. 24 and 25 and "copy", "move", "paste" and "delete" functions are connected with the first touch gesture 66 set in the memory 160.

As a result, the controller 180 displays on the file ("1.a.jpg") UI objects representing "copy," "move," "paste" and "delete" connected with the first touch gesture 62, as shown in FIG. 32 (a).

Here, when the user selects "delete" UI object, the controller 180 may delete "1. a.jpg" from the memory as shown in FIG. 32 (b).

Figure 33:
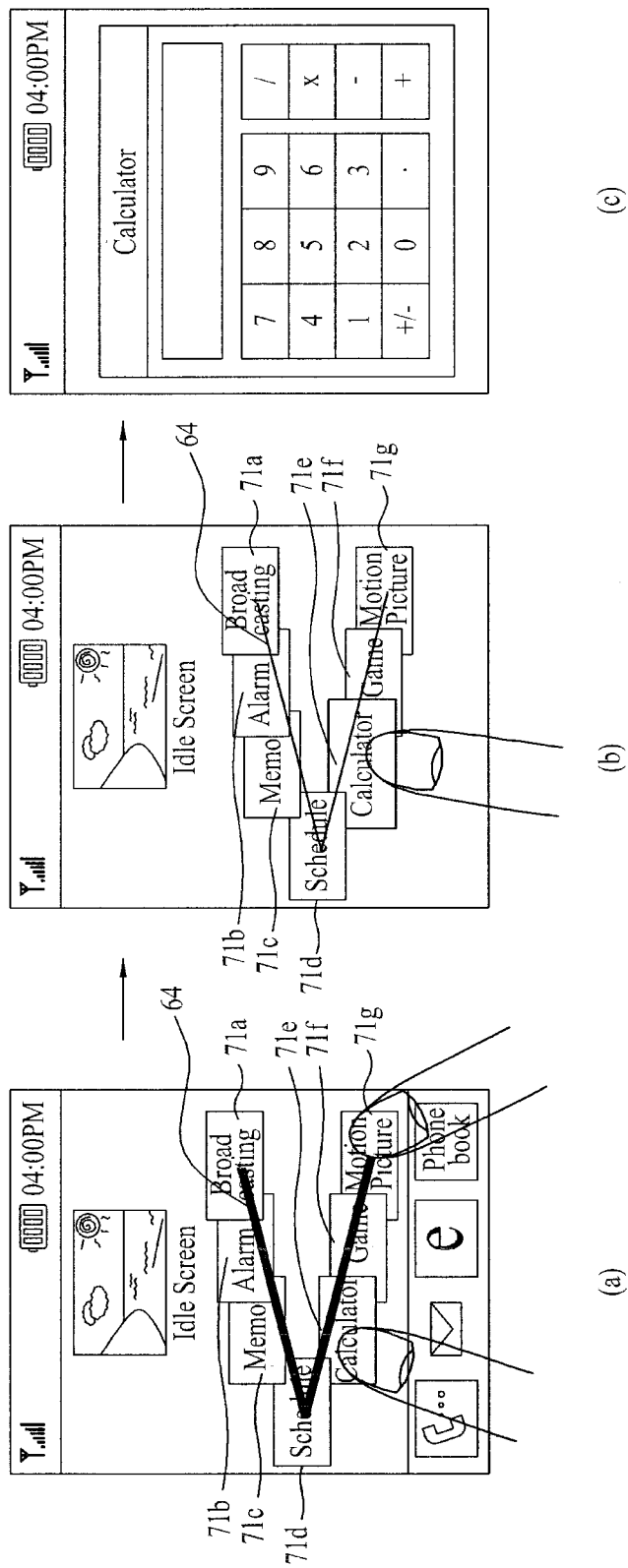

Next, FIG. 33 (a) illustrates "favorite menu" UI objects 71a to 71g connected with the third touch gesture 64 which is displayed at a location of the third pattern ("∧") of the input third touch gesture 64 on the idle-screen of the touchscreen 151.

At this time, in case UI objects 72a to 72e connected with the touch gesture inputted from the user have a large amount of displays, it is difficult for the user to touch a wished UI object 71e out of the UI objects 72a to 72e.

Because of that, when one of the UI objects 72a to 72e is selected initially, the controller 180 enlargedly displays the selected UI object 72e when the enlarged UI object 72e is re-selected, it executes "calculator" which is a functions corresponding to the UI object 72e, as shown in FIG. 33 (b).

Next, FIG. 34 (a) illustrates the fourth touch gesture 65 having the fourth pattern ("C") recognized on the idle-screen of the touchscreen 151 and "abbreviated number" UI objects 74a to 74d connected with the fourth touch gesture 65.

At this time, when "TOM abbreviated number" UI object 74c is selected out of "abbreviated number" UI objects 74a to 74d, the controller 180 displays UI objects 76a to 76d representing functions related with the selected "TOM abbreviated number" UI object 74c adjacent to the "TOM abbreviated number" UI object 74c, as shown in FIG. 34 (b).

When "call connection" UI object 76c is selected out of the UI objects 76a to 76d representing functions related with "TOM abbreviated number" UI object 74c, the controller 180 may control the wireless communication unit 110 to try calling to a telephone number of "TOM", as shown in FIG. 34 (c).

As mentioned above, the mobile terminal and the method for controlling the same according to the present invention has following advantageous effects. First of all, usage-locked UI objects in the touch locked touchscreen may be unlocked and functions provided with the UI objects may be executed by way of the user's touch gesture. As a result, the user may be provided with simple and convenient input operation.

Furthermore, according to the mobile terminal and the method for controlling the same, when the touch gesture is input on the touchscreen, functions, information and menu-icons may be sorted and displayed near the input touch gesture. As a result, the user may display and use desired functional icons and favorite menus by way of touch gestures simply without complex menu operations.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
a touchscreen that displays a locked screen including an item that indicates a usage lock state of contact information of a specific counterpart when a screen of the touchscreen is locked, wherein the contact information includes an image of the specific counterpart, and wherein the image is displayed as a background image of the displayed item; and a hardware controller that;
   when a specific touch gesture is input on the item, unlocks the locked screen and the usage lock state of the contact information corresponding to the item;
   executes a specific function having a name associated with a shape of a pattern of the input specific touch gesture; and
   controls the touchscreen to display a screen of the executed specific function, wherein the hardware controller further:
      controls the touchscreen to display a touch gesture setting window to set the specific touch gesture;
      examines an amount of pixels and pattern variation of the specific touch gesture input via the touch gesture setting window;
      when the amount of pixels and the pattern variation of the specific touch gesture are lower than predetermined pixel amount and a predetermined pattern variation, determines that the specific touch gesture input via the touch gesture setting window has a simple pattern; and
      controls the touchscreen to display a warning window including notification information, wherein the notification information indicates that the specific touch gesture input via the touch gesture setting window has a simple pattern and the specific touch gesture is to be re-input at the touch gesture setting window.

2. The mobile terminal of claim 1, wherein the specific function does not execute while the screen of the touchscreen is locked.

3. A method for controlling a mobile terminal, the method comprising:
   displaying, on a touchscreen of the mobile terminal, a locked screen including an item that indicates a usage lock state of contact information of a specific counterpart when a screen of the touchscreen is locked, wherein the contact information includes an image of the specific counterpart, and wherein the image is displayed as a background image of the displayed item;
   when a specific touch gesture is input on the item, unlocking the locked screen and the usage lock state of the contact information corresponding to the item;
   executing a specific function having a name associated with a shape of a pattern of the input specific touch gesture;
   displaying a screen of the executed specific function;
   displaying a touch gesture setting window for setting the specific touch gesture;
   examining an amount of pixels and pattern variation of the specific touch gesture input via the touch gesture setting window;
   when the amount of pixels and pattern variation of the specific touch gesture are lower than a predetermined pixel amount and a predetermined pattern variation, determining that the specific touch gesture input via the touch gesture setting window has a simple pattern; and
   displaying a warning window including notification information, wherein the notification information indicates that the specific touch gesture input via the touch gesture setting window has a simple pattern and the specific touch gesture is to be re-input at the touch gesture setting window.

* * * * *